(12) United States Patent
Hung et al.

(10) Patent No.: US 12,494,234 B2
(45) Date of Patent: Dec. 9, 2025

(54) MANAGING DATA TRANSFER IN SEMICONDUCTOR DEVICES

(71) Applicant: Macronix International Co., Ltd., Hsinchu (TW)

(72) Inventors: Ji-Yu Hung, Toufen (TW); E-Yuan Chang, Chiayi (TW)

(73) Assignee: Macronix International Co., Ltd., Hsinchu (TW)

( * ) Notice: Subject to any disclaimer, the term of this patent is extended or adjusted under 35 U.S.C. 154(b) by 153 days.

(21) Appl. No.: 18/077,557

(22) Filed: Dec. 8, 2022

(65) Prior Publication Data

US 2024/0194228 A1    Jun. 13, 2024

(51) Int. Cl.
  *G11C 7/00* (2006.01)
  *G11C 7/10* (2006.01)
  *G11C 16/30* (2006.01)

(52) U.S. Cl.
  CPC .......... *G11C 7/1048* (2013.01); *G11C 16/30* (2013.01)

(58) Field of Classification Search
  CPC ....... G11C 7/1048; G11C 16/30; G11C 5/147; G11C 16/0483; G11C 16/10
  USPC ....................................................... 365/203
  See application file for complete search history.

(56) References Cited

U.S. PATENT DOCUMENTS

| | | | |
|---|---|---|---|
| 6,278,636 B1 | 8/2001 | Lee | |
| 10,103,716 B2 * | 10/2018 | Takagiwa | H03K 3/356147 |
| 2003/0002333 A1 | 1/2003 | Hidaka | |
| 2004/0233695 A1 | 11/2004 | Kang | |
| 2005/0122813 A1 | 6/2005 | Kang | |
| 2014/0286104 A1 * | 9/2014 | Kamata | G11C 16/08 365/185.21 |
| 2015/0023087 A1 | 1/2015 | Takahashi | |
| 2015/0078102 A1 * | 3/2015 | Yasufuku | G11C 7/1048 365/189.05 |
| 2022/0310149 A1 | 9/2022 | Brox | |

FOREIGN PATENT DOCUMENTS

| | | |
|---|---|---|
| JP | 2016167331 | 9/2016 |
| KR | 10-2017-0120370 | 4/2021 |
| TW | 396307 | 7/2000 |
| TW | 448479 | 8/2001 |

* cited by examiner

*Primary Examiner* — Tha-O H Bui
(74) *Attorney, Agent, or Firm* — Fish & Richardson P.C.

(57) ABSTRACT

Systems, methods, circuits, and apparatus for managing data transfer in semiconductor devices are provided. In one aspect, an integrated circuit includes: a first circuit, a data bus coupled to the first circuit, and a precharging circuit coupled to the data bus. The precharging circuit is configured to precharge the data bus to have a predetermined voltage before data is transferred through the data bus. The first circuit is conductively coupled to the data bus by applying a control voltage to the first circuit. The control voltage is determined based on the predetermined voltage.

21 Claims, 12 Drawing Sheets

MANAGING DATA TRANSFER IN SEMICONDUCTOR DEVICES

BACKGROUND

Semiconductor devices, e.g., memory devices, are becoming smaller and faster. One limitation on data transfer speed of a semiconductor device arises from large parasitic capacitance caused by metal lines shared by components in the semiconductor device, which can dramatically decrease the data transfer speed and lengthen the transferring time.

SUMMARY

The present disclosure describes methods, systems, devices, circuits, and techniques for managing data transfer in semiconductor devices.

One aspect of the present disclosure features an integrated circuit, including: a first circuit: a data bus coupled to the first circuit: and a precharging circuit coupled to the data bus. The precharging circuit is configured to precharge the data bus to have a predetermined voltage before data is transferred through the data bus. The first circuit is conductively coupled to the data bus by applying a control voltage to the first circuit, the control voltage being determined based on the predetermined voltage.

In some embodiments, the predetermined voltage is a fixed voltage, and the control voltage is determined further by tracking a variation of a threshold voltage (or a threshold voltage variation) of a transistor in the first circuit.

In some embodiments, the integrated circuit further includes a second circuit coupled to the data bus. The precharging circuit is configured to precharge the data bus to have the predetermined voltage before the data is transferred between the first circuit and the second circuit through the data bus.

In some embodiments, the first circuit includes a first control transistor configured to receive a first control signal, and the second circuit includes a second control transistor configured to receive a second control signal. The first control signal is configured to turn on the first control transistor with a first control voltage to cause the first circuit to be conductively coupled to the data bus, and the second control signal is configured to turn on the second control transistor with a second control voltage to cause the second circuit to be conductively coupled to the data bus. Each of the first control voltage and the second control voltage is determined based on the predetermined voltage.

In some embodiments, the first control transistor has a first terminal coupled to the data bus, a second terminal coupled to a first node in the first circuit, and a first gate terminal configured to receive the first control signal, and the second control transistor has a first terminal coupled to the data bus, a second terminal coupled to a second node in the second circuit, and a second gate terminal configured to receive the second control signal.

In some embodiments, each of the first control voltage and the second control voltage is determined by tracking a variation of a threshold voltage of a reference transistor, and a variation of a threshold voltage of each of the first control transistor and the second control transistor is substantially same as the variation of the threshold voltage of the reference transistor.

In some embodiments, the integrated circuit further includes a voltage generator including the reference transistor, and the voltage generator is configured to generate the first control voltage and the second control voltage based on the threshold voltage of the reference transistor.

In some embodiments, the reference transistor includes a first terminal coupled to a current source, a second terminal coupled to a resistor, and a gate terminal coupled to the first terminal, the predetermined voltage corresponds to a voltage at the second terminal that is based on a resistance of the resistor and a current from the current source to the resistor, a reference voltage at the gate terminal is a sum of the voltage at the second terminal and the threshold voltage of the reference transistor, and each of the first control voltage and the second control voltage is based on the reference voltage.

In some embodiments, the current from the current source to the resistor is a constant current. In some embodiments, the precharging circuit is configured to precharge the data bus at a constant current.

In some embodiments, the voltage generator further includes an operational amplifier coupled to the gate terminal of the reference transistor. The operational amplifier can be configured to output a tracking voltage based on the reference voltage. Each of the first control voltage and the second control voltage can be based on the tracking voltage.

In some embodiments, the operational amplifier includes a voltage follower or a unity gain amplifier. In some embodiments, the integrated circuit further includes: a first logic gate having a first logic input coupled to an output of the operational amplifier and a first logic output coupled to a first gate terminal of the first control transistor, and a second logic gate having a second logic input coupled to the output of the operational amplifier and a second logic output coupled to a second gate terminal of the second control transistor, where each of the first control voltage and the second control voltage is substantially identical to the tracking voltage.

In some embodiments, the resistance of the resistor is adjustable, and where the predetermined voltage is determined based on a result of adjusting the resistance of the resistor. In some embodiments, the predetermined voltage is determined by a comparison of response times of data transfer between the first circuit and the second circuit through the data bus with different resistances of the resistor.

In some embodiments, a response time of data transfer is determined based on the predetermined voltage and a parasitic capacitance associated with the data bus.

In some embodiments, the integrated circuit is configured to transfer the data from the first circuit to the second circuit by using a voltage at a second node coupled to the second control transistor in the second circuit representing a same value as a voltage at a first node coupled to the first control transistor in the first circuit.

In some embodiments, before the data is transferred, the second circuit is configured to be reset to cause the voltage at the second node in the second circuit to represent a bit value "1". The second circuit can include a unidirectional tri-state latch.

In some embodiments, after the data bus is charged by the precharging circuit to have the predetermined voltage, the first control transistor is turned on by the first control signal with the first control voltage. The predetermined voltage on the data bus can be discharged if the voltage at the first node represents a bit value "0", or the predetermined voltage on the data bus can remain unchanged if the voltage at the first node represents the bit value "1".

In some embodiments, after the voltage of the first node is stable, the second control transistor is turned on by the second control signal with the second control voltage. The voltage at the second node in the second circuit can be discharged to a voltage representing the bit value "0" if the data bus has a discharged voltage corresponding to the voltage of the first node representing the bit value "0", or the voltage at the second node can remain unchanged if the data bus remains at the predetermined voltage corresponding to the voltage of the first node representing the bit value "1".

In some embodiments, the second circuit is configured to: maintain the voltage at the second node representing the bit value "1" by conductively connecting the second node to a supply voltage, and before the second control transistor is turned on, conductively isolate the second node from the supply voltage to cause the second node to float with the voltage representing the bit value "1".

In some embodiments, the integrated circuit includes a page buffer circuit, and the page buffer circuit includes the first circuit as a first latch, the second circuit as a second latch, and the data bus. The first circuit and the second circuit can be in a same page buffer.

In some embodiments, the integrated circuit includes: a page buffer circuit including the first circuit as a first latch, and a cache circuit including the second circuit as a second latch. In some embodiments, each of the first latch and the second latch is a unidirectional tri-state latch.

Another aspect of the present disclosure features a semiconductor device, including: a plurality of latches: a data bus coupled to each of the plurality of latches: and a precharging circuit coupled to the data bus. The precharging circuit is configured to precharge the data bus to have a predetermined voltage before data is transferred from a first latch to a second latch among the plurality of latches, and at least one of the first latch or the second latch is conductively coupled to the data bus by applying a control voltage to the at least one of the first latch or the second latch, the control voltage being determined based on the predetermined voltage.

In some embodiments, the predetermined voltage is a fixed voltage, and the control voltage is determined further by tracking a variation of a threshold voltage of a transistor in the at least one of the first latch or the second latch.

In some embodiments, the first latch includes a first control transistor coupled to the data bus and configured to receive a first control signal with a first control voltage to turn on the first control transistor. The second latch can include a second control transistor coupled to the data bus and configured to receive a second control signal with a second control voltage to turn on the second control transistor. Each of the first control voltage and the second control voltage can be determined based on the predetermined voltage and by tracking a variation of a threshold voltage of a reference transistor, and a variation of a threshold voltage of each of the first control transistor and the second control transistor can be substantially same as the variation of the threshold voltage of the reference transistor.

In some embodiments, the semiconductor device further includes a voltage generator including the reference transistor. The reference transistor includes a first terminal coupled to a current source, a second terminal coupled to a resistor, and a gate terminal coupled to the first terminal, and the predetermined voltage corresponds to a voltage at the second terminal that is based on a resistance of the resistor and a current from the current source to the resistor. A reference voltage at the gate terminal is a sum of the voltage at the second terminal and the threshold voltage of the reference transistor, and each of the first control voltage and the second control voltage can be based on the reference voltage.

In some embodiments, the voltage generator further includes an operational amplifier coupled to the gate terminal of the reference transistor and configured to output a tracking voltage based on the reference voltage. The semiconductor device can further include: a first logic gate having a first logic input coupled to an output of the operational amplifier and a first logic output coupled to the first control transistor, and a second logic gate having a second logic input coupled to the output of the operational amplifier and a second logic output coupled to the second control transistor. Each of the first control voltage and the second control voltage can be substantially identical to the tracking voltage.

In some embodiments, the semiconductor device includes a page buffer circuit including the plurality of latches and the data bus. In some embodiments, the semiconductor device includes: a page buffer circuit including the first latch, and a cache circuit including the second latch. The cache circuit can be coupled to the page buffer circuit through the data bus.

In some embodiments, the semiconductor device further includes a memory cell array for storing data in memory cells, and the page buffer circuit is coupled to the memory cell array.

A further aspect of the present disclosure features a method including: precharging a data bus to have a predetermined voltage on the data bus: conductively connecting a first circuit to the data bus by applying a first control voltage on the first circuit to cause a voltage on the data bus to correspond to a voltage at a first node in the first circuit, the voltage on the data bus being associated with the predetermined voltage on the data bus: and conductively connecting a second circuit to the data bus by applying a second control voltage on the second circuit to cause a voltage at a second node in the second circuit corresponding to the voltage on the data bus. Each of the first control voltage and the second control voltage can be determined based on the predetermined voltage.

Implementations of the above techniques include methods, systems, circuits, computer program products and computer-readable media. In one example, a method can be performed in a non-volatile memory and the method can include the above-described actions, e.g., the actions for managing data transfer. In another example, one such computer program product is suitably embodied in a non-transitory machine-readable medium that stores instructions executable by one or more processors. The instructions are configured to cause the one or more processors to perform the above-described actions. One such computer-readable medium stores instructions that, when executed by one or more processors, are configured to cause the one or more processors to perform the above-described actions.

The techniques can be implemented in any type of circuits or devices that need data transfer between components in the circuits or devices and have data transfer speed issues and/or power consumption issues. The techniques can improve data transfer speed and reduce power consumption. The techniques can be implemented with any types of memory transistors (or memory cells), any types of metal-oxide-silicon (MOS) transistors, e.g., n-channel and/or p-channel transistors, any types of bipolar junction transistors (BJTs), and any types of operational amplifiers. The techniques can be applied to different types of memory systems, e.g., two-dimensional (2D) memory systems or three-dimensional (3D) memory systems. The techniques can be applied to various memory cell types, such as SLC (single-level cell), or MLC (multi-level cell) like 2-level cell, TLC (triple-level cell), TLC (quad-level cell), or PLC (Penta-level cell). The techniques can be applied to various types of volatile memory devices or non-volatile memory devices, such as Static Random Access Memory (SRAM), Dynamic Random Access Memory (DRAM), flash memory such as NOR flash memory and/or NAND flash memory, resistive random-access memory (RRAM), magnetoresistive random-access memory (MRAM), phase-change random-access memory (PCRAM), among others. Additionally or alternatively, the techniques can be applied to various types of devices and systems, such as secure digital (SD) cards, embedded multimedia cards (eMMC), or solid-state drives (SSDs), embedded systems, among others.

In the present disclosure, "A is substantially identical to B" indicates that: 1) A is exactly identical to B or 2) a difference between A and B is less than a predetermined threshold, e.g., 1% or 0.1% of a value of A or B or any suitable threshold. Similarly, "A is substantially same as B" indicates that: 1) A is the same as B: or 2) a difference between A and B is less than a predetermined threshold, e.g., 1% or 0.1% of a value of A or B or any suitable threshold. For example, if voltage A is substantially identical to voltage B, it indicates that voltage A is identical to voltage B, or a difference between voltage A and voltage B is less than a threshold, e.g., 0.1% of voltage A, 1 mV, 1 µV, or any suitable threshold.

The details of one or more disclosed implementations are set forth in the accompanying drawings and the description below. Other features, aspects, and advantages will become apparent from the description, the drawings and the claims.

BRIEF DESCRIPTION OF THE DRAWINGS

Like reference numbers and designations in the various drawings indicate like elements. It is also to be understood that the various exemplary implementations shown in the figures are merely illustrative representations and are not necessarily drawn to scale.

DETAILED DESCRIPTION

Example Systems and Devices

Figure 1A:
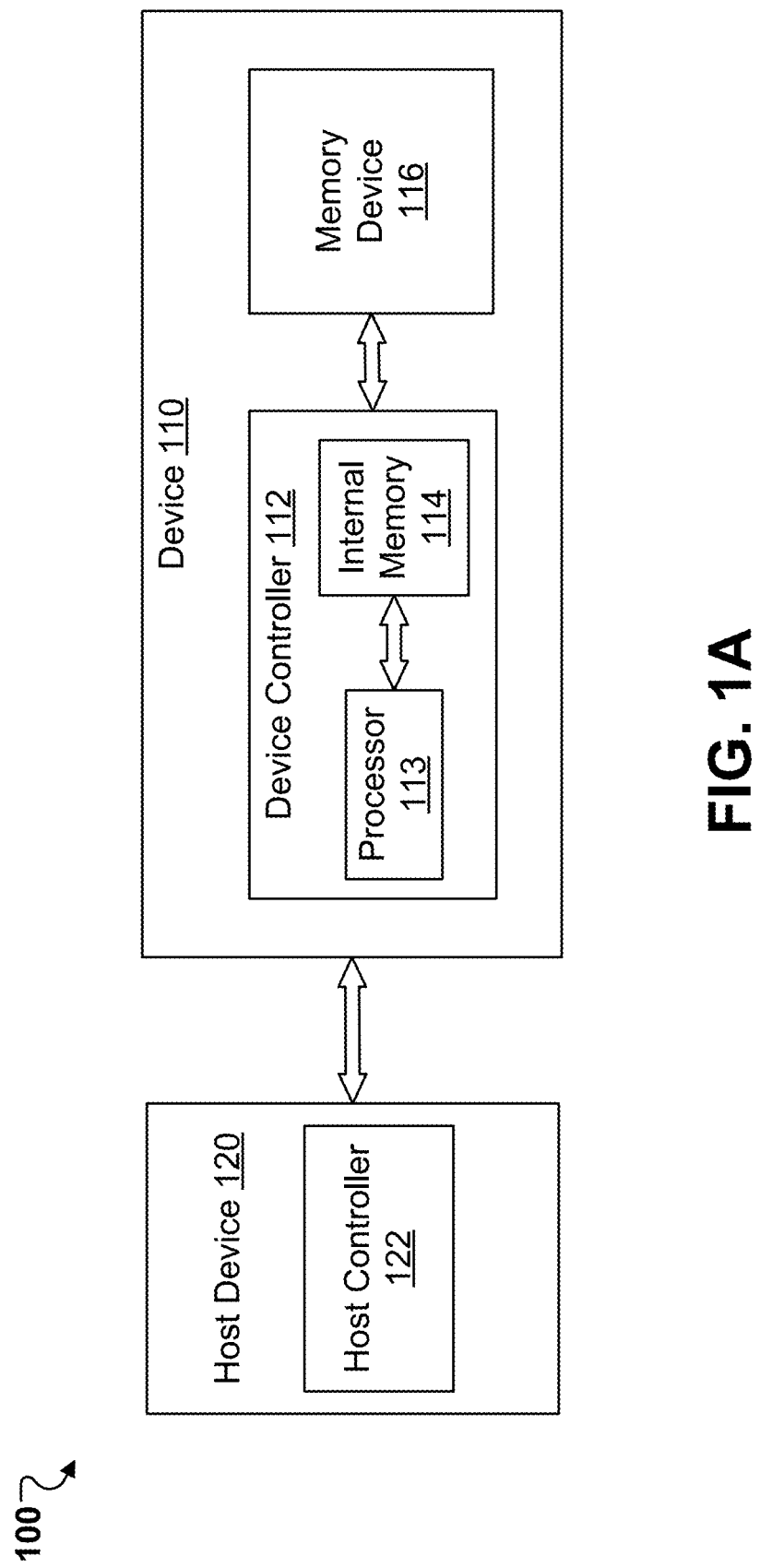
FIG. 1A illustrates an example system including a memory device.

FIG. 1A illustrates an example of a system 100. The system 100 includes a device 110 and a host device 120. The device 110 includes a device controller 112 and a memory device 116. The device controller 112 includes a processor 113 and an internal memory 114. In some implementations, the device 110 includes a plurality of memories 116 that are coupled to the device controller 112. The host device 120 includes a host controller 122 that can include at least one processor and at least one memory coupled to the at least one processor and storing programming instructions for execution by the at least one processor to perform one or more corresponding operations.

In some implementations, the device 110 is a storage device. For example, the device 110 can be an embedded multimedia card (eMMC), a secure digital (SD) card, a solid-state drive (SSD), or some other suitable storage. In some implementations, the device 110 is a smart watch, a digital camera or a media player. In some implementations, the device 110 is a client device that is coupled to a host device 120. For example, the device 110 is an SD card in a digital camera or a media player that is the host device 120.

The device controller 112 is a general-purpose microprocessor, or an application-specific microcontroller. In some implementations, the device controller 112 is a memory controller for the device 110. The following sections describe the various techniques based on implementations in which the device controller 112 is a memory controller. However, the techniques described in the following sections are also applicable in implementations in which the device controller 112 is another type of controller that is different from a memory controller.

The processor 113 is configured to execute instructions and process data. The instructions include firmware instructions and/or other program instructions that are stored as firmware code and/or other program code, respectively, in the secondary memory. The data includes program data corresponding to the firmware and/or other programs executed by the processor, among other suitable data. In some implementations, the processor 113 is a general-purpose microprocessor, or an application-specific microcontroller. The processor 113 is also referred to as a central processing unit (CPU).

The processor 113 accesses instructions and data from the internal memory 114. In some implementations, the internal memory 114 is a Static Random Access Memory (SRAM) or a Dynamic Random Access Memory (DRAM). For example, in some implementations, when the device 110 is an eMMC, an SD card or a smart watch, the internal memory 114 is an SRAM. In some implementations, when the device 110 is a digital camera or a media player, the internal memory 114 is DRAM.

In some implementations, the internal memory is a cache memory that is included in the device controller 112, as shown in FIG. 1. The internal memory 114 stores instruction codes, which correspond to the instructions executed by the processor 113, and/or the data that are requested by the processor 113 during runtime.

The device controller 112 transfers the instruction code and/or the data from the memory device 116 to the internal memory 114. The memory device 116 can be a semiconductor device. In some implementations, the memory device 116 is a non-volatile memory that is configured for long-term storage of instructions and/or data, e.g., a NAND flash memory, or some other suitable non-volatile memory. In implementations where the memory device 116 is NAND flash memory, the device 110 is a flash memory, e.g., a flash memory card, and the device controller 112 is a NAND flash controller. For example, in some implementations, when the device 110 is an eMMC or an SD card, the memory device 116 is a NAND flash: in some implementations, when the device 110 is a digital camera, the memory device 116 is an SD card: and in some implementations, when the device 110 is a media player, the memory device 116 is a hard disk.

In some implementations, the device controller 112 is configured to receive data and instructions from and to send data to the host device 120. The device controller 112 is further configured to send data and commands to the memory device 116 and to receive data from the memory device 116. For example, the device controller 112 is configured to send data and a write command to instruct the memory device 116 to store the data to a specified address. As another example, the device controller 112 is configured to receive a read request (or a read command) from the host device 120 and send a corresponding read command to the memory device 116 to read data from a specified address in the memory device 116.

The memory device 116 includes a plurality of blocks. The memory device 116 can be a two-dimensional (2D) memory including 2D memory blocks, e.g., as described with further details in FIG. 1B. The memory device 116 can also be a three-dimensional (3D) memory including 3D memory blocks, e.g., as described with further details in FIG. 1C. Each block can include a same number of pages. Each page has a unique number in the block. Data is stored in the pages of the block according to the order of the unique numbers of the pages in the block. Each page can be read or written separately, and pages in a block can be erased together.

In some implementations, a block can be divided into a number of sub-blocks. Each sub-block can include one or more pages. Each page in a sub-block can be read or written separately. The one or more pages in each sub-block can be erased together. In some implementations, the memory device 116 includes one or more dies. Each die can be a memory chip and include a number of memory arrays and peripheral circuitry thereon. A memory array can include a number of planes, with each plane including a number of physical blocks of memory cells. Each physical block can include a number of pages of memory cells that can store a number of sectors of data. A super block can be specified, e.g., by a memory controller such as the controller 112 of FIG. 1A, to combine at least one physical block from different planes. Each physical block in the super block comes from a different plane, that is, any plane cannot provide more than one block in the super block. The super block includes a number of super pages each combining multiple pages from the corresponding multiple physical blocks in the super block. Each page in a super page can have a same page number in its corresponding physical block. A super page can be programmed with all the pages in the super page being programmed simultaneously.

A memory cell can represent a number of states including an erased state and one or more programmed states. For example, in some cases, the memory cell is a single-level cell (SLC) that can store 1 bit and represent 2 states including an erased state (ER) and a programmed state (A). Memory cells in one word line can form one page. In some cases, the memory cell is a multi-level cell (MLC) such as a 2-level cell that can store 2 bits and represent 4 states including an erased state (ER) and three programmed states (A, B, and C). Memory cells in one word line can form two pages. In some cases, the memory cell is a triple-level cell (TLC) that can store 3 bits and represent 8 states including an erased state (ER) and seven programmed states (A, B, C, D, E, F, and G). Memory cells in one word line can form three pages. The states can have progressively higher voltage ranges, and the erased state has the lowest voltage rage.

Figure 1B:
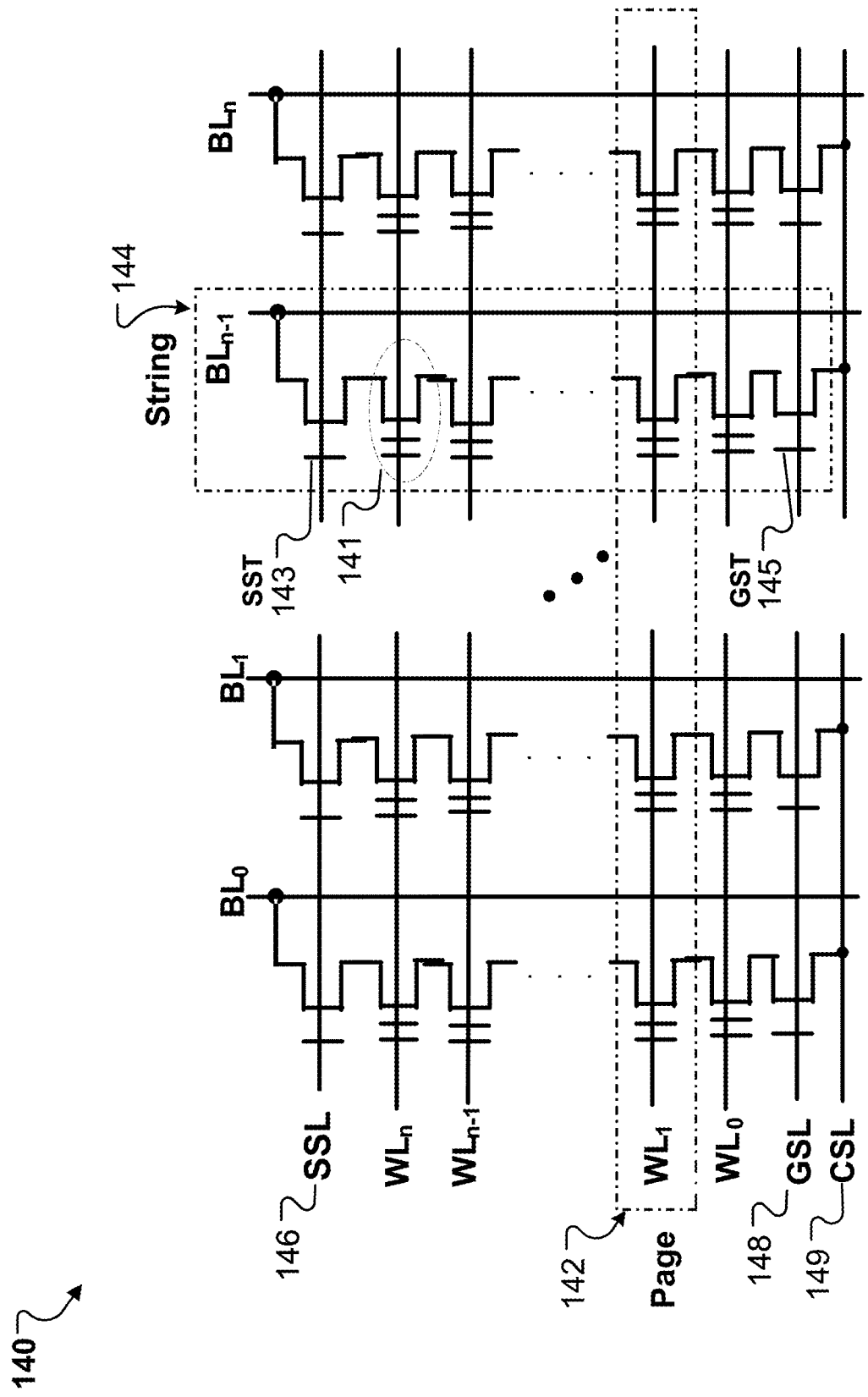
FIG. 1B illustrates an example block of a two-dimensional (2D) memory device.

FIG. 1B illustrates an example configuration of a 2D memory block 140 when the memory device 116 is a 2D memory. The block 140 includes memory cells 141 coupled in series to column bit lines $BL_0, BL_1, \ldots, BL_{n-1},$ and $BL_n$ to form a number of cell strings 144, and to row word lines $WL_0, WL_1, \ldots, WL_{n-1},$ and $WL_n$ to form a number of cell pages 142.

Each memory cell in a block includes a transistor structure having a gate, a drain, a source, and a channel defined between the drain and the source. Each memory cell is located at an intersection between a word line and a bit line, where the gate is connected to the word line, the drain is connected to the bit line, and the source is connected to a source line, which in turn is connected to common ground. In some examples, the gate of a flash memory cell has a dual-gate structure, including a control gate and a floating gate, where the floating gate is suspended between two oxide layers to trap electrons that program the cell.

A cell string 144 can include a number of memory cells 141, a string select transistor (SST) 143, and a ground select transistor (GST) 145, which are all connected in series. A gate of the SST 143 is connected to a string select line (SSL) 146. Gates of the SSTs 143 in different strings are also connected to the same SSL. Gates of the memory cells 141 are respectively connected to word lines $WL_0, WL_1, \ldots, WL_{n-1}, WL_n$. The cell strings 144 or the memory cells 141 are connected to a common source line (CSL) 149 via the GST 145. The CSL 149 can be coupled to a ground or a supply voltage. A gate of the GST 145 is connected to a ground select line (GSL) 148. Gates of the GSTs 145 in different strings 144 are also connected to the same GSL 148.

A cell page 142 can include a number of memory cells 141. Gates of the memory cells 141 in the cell page 142 are coupled in series to a respective word line (WL). When an input voltage is applied to the word line, the input voltage is also applied to the gates of the memory cells 141 in the cell page 142. To read a particular cell page 142 in the block 140 in a read operation, a lower read voltage is applied onto a word line corresponding to the particular cell page 142. Meanwhile, a higher read voltage is applied onto the other cell pages in the block 140.

Figure 1C:
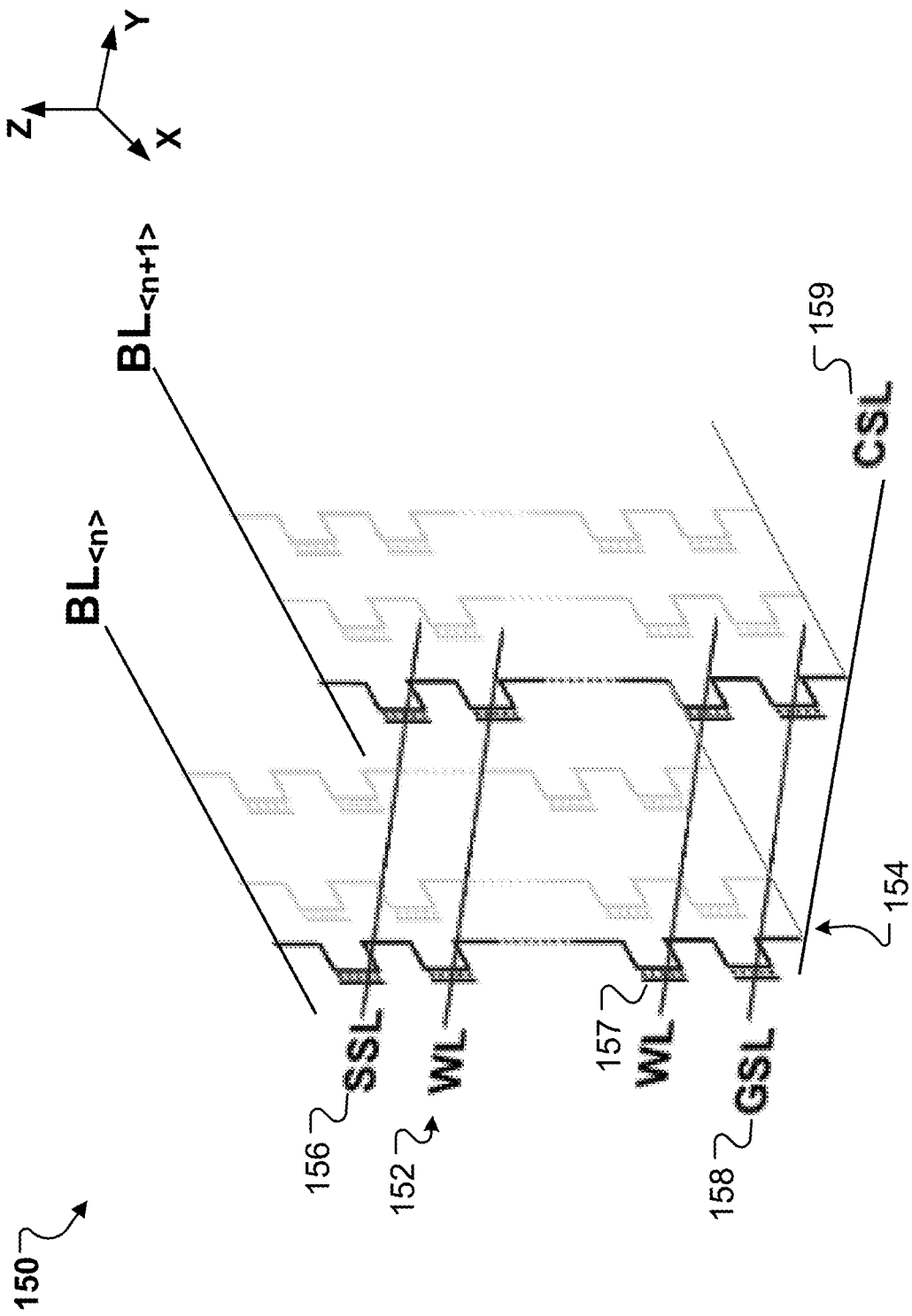
FIG. 1C illustrates an example block of a three-dimensional (3D) memory device.

FIG. 1C illustrates an example 3D memory block 150 when the memory device 116 (shown in FIG. 1A) is a 3D memory. The 3D memory block 150 can include a stack of the 2D memory block 140 of FIG. 1B. Memory cells 157 are arranged in three dimensions, e.g., in an XYZ coordinate system, and coupled to a number of word lines to form a number of cell pages (conductive layers or word line layers) 152 and a number of bit lines (e.g., $BL_{<n>}, BL_{<n+1>}$) to form a number of cell strings 154. A cell page 152 can be a layer, e.g., in the XY plane, and memory cells 157 on the same layer can be coupled to one word line and have a same voltage. Each cell page 152 can be connected to a respective contact pad in a driving circuit, e.g., X-decoder (or a scanning driver).

A cell string 154 includes a number of memory cells 157 connected in series vertically along the Z direction, where a memory cell can be configured as an SST coupled to a string select line (SSL) 156 and a memory cell can be configured as a GST coupled to a ground select line (GSL) 158. The cell strings 154 are connected to one or more drivers, e.g., data drivers. The cell strings 154 of the memory cells 157 are connected to a common source line (CSL) 159 via the ground select transistors (GSTs). The CSL 159 can be a conductive layer (or multiple conductive lines) formed on a substrate of the 3D memory. The CSL 159 can be coupled to the ground or a supply voltage.

Figure 2:
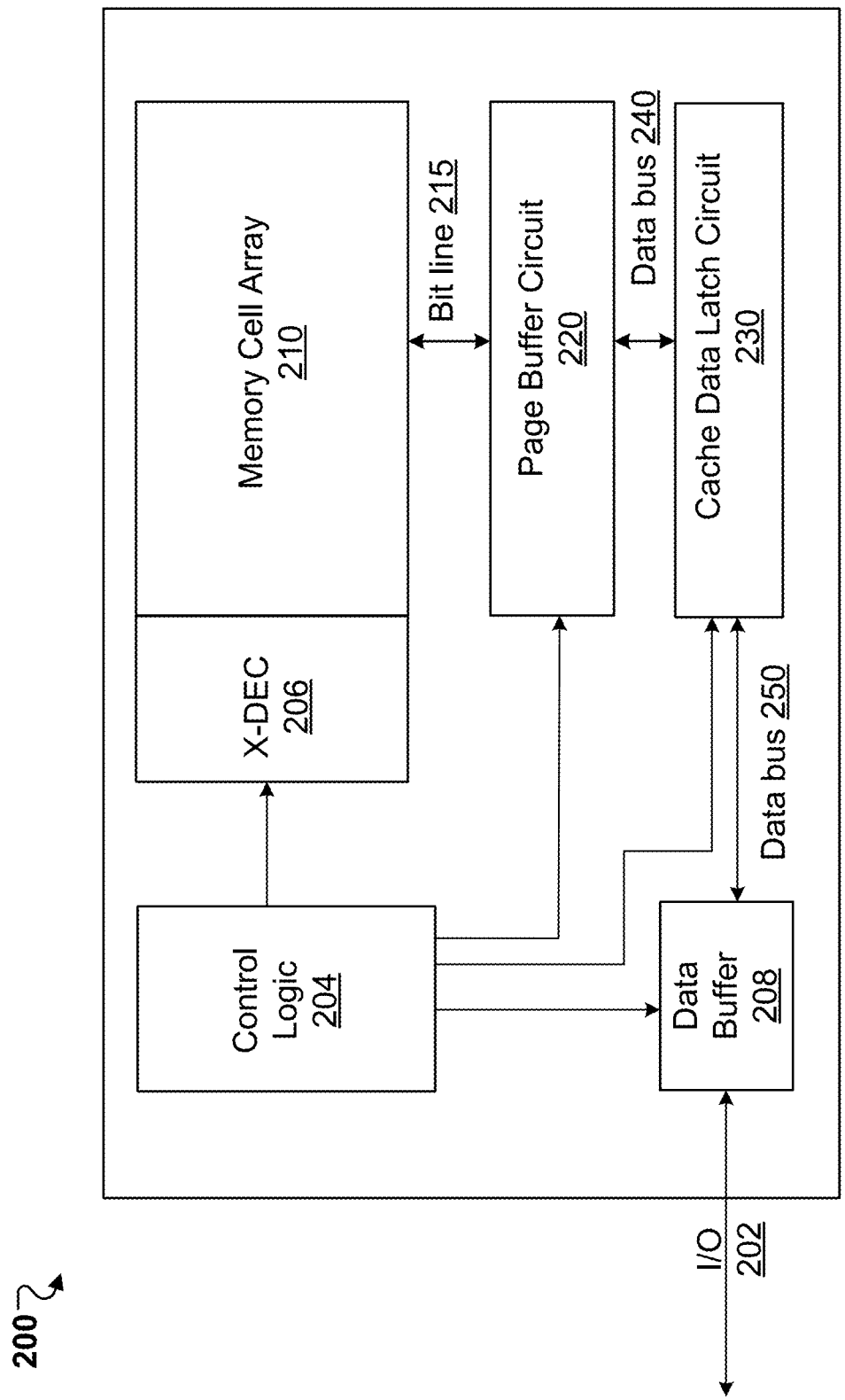
FIG. 2 shows a schematic diagram of an example memory device.

FIG. 2 illustrates an example configuration of a memory device 200. The memory device 200 can be implemented as the memory device 116 of FIG. 1A. The memory device 200 includes a memory cell array 210. The memory cell array 210 can include a number of memory cells, e.g., the memory cells 141 of FIG. 1B or the memory cells 157 of FIG. 1C, coupled in series to a number of row word lines and a number of column bit lines.

A memory cell can include a memory transistor configured as a storage element. The memory transistor can include a silicon-oxide-nitride-oxide-silicon (SONOS) transistor, a floating gate transistor, a nitride read only memory (NROM) transistor, or any suitable non-volatile memory metal-oxide-semiconductor (MOS) device that can store charges.

The memory device 200 includes a memory interface 202 having multiple input/output (I/O) ports for receiving data, e.g., from a controller such as the device controller 112 or the host controller 122 of FIG. 1A, or outputting data from the memory cell array 210. The memory device 200 includes a data buffer 208 configured to buffer data received and outputted through the memory interface 202.

The memory device 200 can further include an X-decoder (or row decoder) 206 and optionally a Y-decoder. Each memory cell is coupled to the X-decoder 206 via a respective word line and coupled to the Y-decoder via a respective bit line 215. Accordingly, each memory cell can be selected by the X-decoder 206 and the Y-decoder for read or write operations through the respective word line and the respective bit line 215.

The memory device 200 includes a page buffer circuit 220 coupled to the memory cell array 210 through the bit lines 215 and a cache data latch (CDL) circuit 230 coupled to the page buffer circuit 220 through a data bus 240. The data bus 240) can include one or more conductive lines (e.g., metal lines) that can be coupled through the page buffer circuit 220) and the CDL circuit 230. The page buffer circuit 220 can include a number of page buffers. Each page buffer can be coupled to the data bus 240. Each page buffer can include multiple latches. The latches can be conductively connected with one another by inner metal routing lines in the page buffer, e.g., internal data-bus line (IDL). Data can be transferred between the latches in the page buffer through the inner metal routing lines. Data can be also transferred between latches in different page buffers through the data bus 240 and/or inner metal routing lines in the different page buffers.

The CDL circuit 230 can include a number of caches for storing data. Each cache can be coupled to the data bus 240. Each cache can include one or more latches that can be conductively connected with one another by inner metal routing lines in the cache. Data can be transferred between the one or more latches in the cache through the inner metal routing lines. Data can be also transferred between latches in different caches in the CDL circuit 230 through the data bus 240) and/or inner metal routing lines in the different caches. Data can be also transferred between caches (or latches) in the CDL circuit 230 and page buffers (or latches) in the page buffer circuit 220 through the data bus 240.

In some embodiments, the data buffer 208 includes a number of latches that can be conductively connected with one another by inner metal routing lines in the data buffer 208. The data buffer 208 can be coupled to the CDL circuit 230 via another data bus (e.g., one or more conductive lines) 250. Data can be transferred between latches in the data buffer 208 and caches (or latches) in the CDL circuit 230 via the data bus 250) and/or inner metal routing lines in the data buffer 208 and in the CDL circuit 230.

In some embodiments, a page buffer is connected to the Y-decoder through a data line associated with a corresponding bit line 215 that connects one or more memory cells in the memory cell array 210. The page buffer can be configured to control a voltage on a corresponding bit line to perform an operation, e.g., read, program, or erase, on a memory cell coupled to the corresponding bit line 215. In some embodiments, during a program or erase operation, the CDL circuit 230 is configured to store data from the data buffer 208 in one or more caches of the CDL circuit 230 and/or output the data from the one or more caches to one or more page buffers in the page buffer circuit 220. During a read operation, the CDL circuit 230 is configured to store data from one or more page buffers of the page buffer circuit 220 in one or more caches of the CDL circuit 230 and/or output the data from the one or more caches to the data buffer 208.

With continued reference to FIG. 2, the memory device 200 can further include a control logic 204 coupled to components in the memory device 200 including the X-decoder 206 and the Y-decoder, the data buffer 208, the page buffer circuit 220, and the CDL circuit 230. The control logic 204 can be configured to receive a command, address information, and/or data, e.g., from a controller such as the device controller 112 or the host controller 122 of FIG. 1A, via the memory interface 202. The control logic 204 can also process the command, the address information, and/or the data, for example, to generate physical address information, e.g., of blocks/pages, in the memory cell array 210. The control logic 204 can include circuitry, e.g., an integrated circuit integrating multiple logics, circuits, and/or components. In some implementations, the control logic 204 includes at least one of a data register, an SRAM buffer, an address generator, a mode logic, or a state machine. The mode logic can be configured to determine whether there is a read or write operation and provide a result of the determination to the state machine.

During a write operation, the data register in the control logic 204 can register input data from the interface 202, and the address generator in the control logic 204 can generate corresponding physical addresses to store the input data in specified memory cells of the memory cell array 210. The address generator can be connected to the X-decoder 206 and the Y-decoder that are controlled to select the specified memory cells through corresponding word lines and bit lines. The SRAM buffer can retain the input data from the data register in its memory as long as power is being supplied. The state machine can process a write signal from the SRAM buffer and provide a control signal to a voltage generator that can provide a write voltage to the X-decoder 206 and/or the Y-decoder. The Y-decoder is configured to output the write voltage to the bit lines (BLs) for storing the input data in the specified memory cells.

During a read operation, the state machine can provide control signals to the voltage generator and the page buffer circuit 220. The voltage generator can provide a read voltage to the X-decoder 206 and the Y-decoder for selecting a memory cell. A page buffer can sense a small power signal (e.g., a current signal) that represents a data bit ("1" or "0") stored in the selected memory cell through a bit line 215 coupled to the page buffer and the selected memory cell. A sense amplifier can amplify the small power signal swing to recognizable logic levels so the data bit can be interpreted properly by logic inside or outside the memory device 200. In some implementations, at least one of the page buffer circuit 220 or the CDL circuit 230 is included in the sense amplifier. The data buffer 208 can receive the amplified voltage from the sensor amplifier and output the amplified power signal to the logic outside the memory device 200 through the memory interface 202.

Example Semiconductor Devices

Figure 3A:
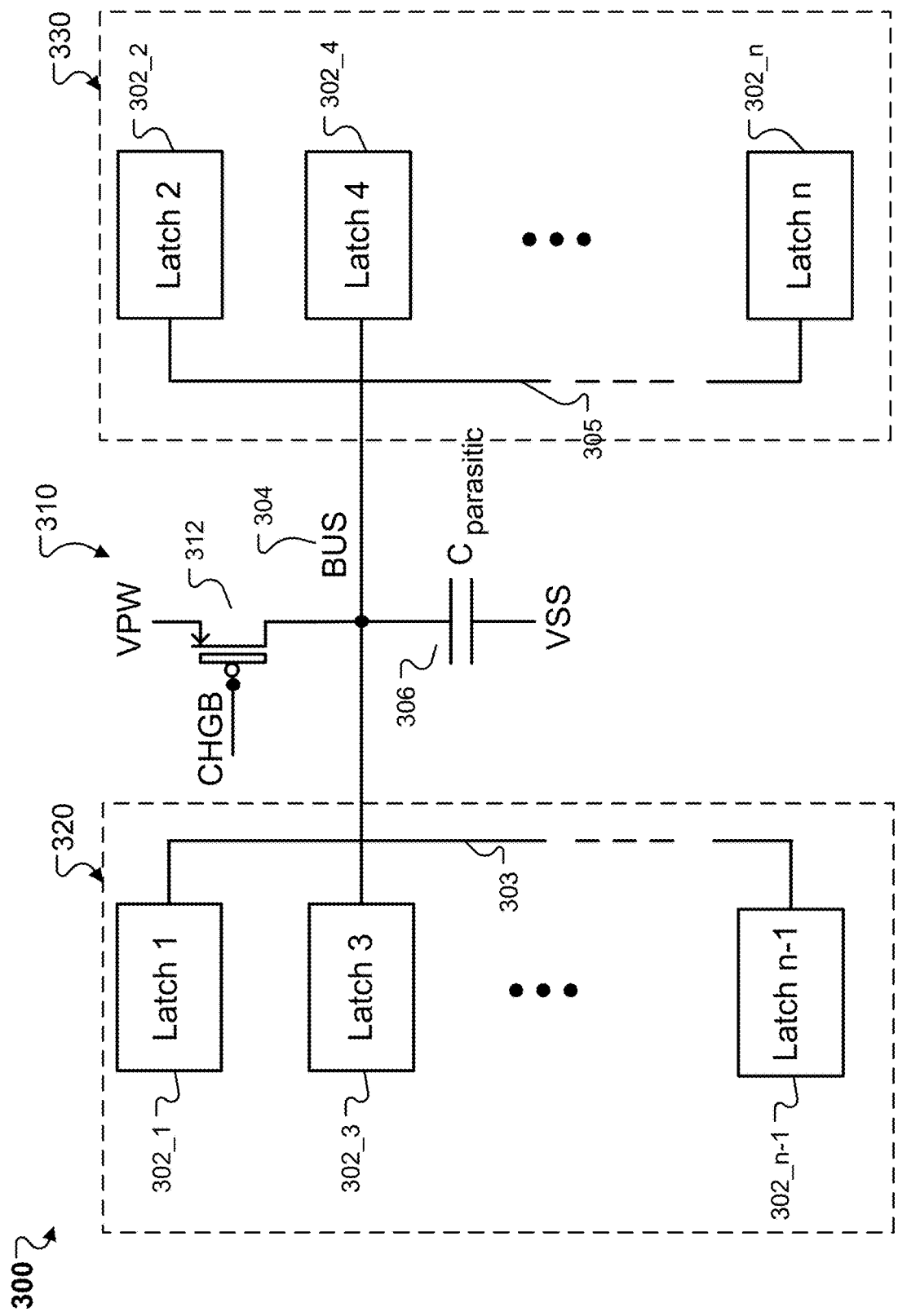
FIG. 3A illustrates an example semiconductor device including multiple latches coupled by a data bus.

FIG. 3A illustrates an example semiconductor device 300 that can implement data transfer among different latches. The semiconductor device 300 can be any suitable device that can implement data transfer between different components such as latches. For example, the semiconductor device 300 can be a memory device, e.g., the memory device 116 of FIG. 1A or the memory device 200 of FIG. 2, where the semiconductor device 300 can include a memory cell array (e.g., the memory cell array 210 of FIG. 2). The semiconductor device 300 can be a page buffer circuit, e.g., the page buffer circuit 220 of FIG. 2, or a page buffer in the page buffer circuit. The semiconductor device 300 can be a cache circuit, e.g., the cache data latch circuit 230 of FIG. 2, or a cache in the cache circuit. The semiconductor device 300 can be a data buffer, e.g., the data buffer 208 of FIG. 2. The semiconductor device 300 can include at least one of a page buffer circuit, a cache circuit, or a data buffer.

As shown in FIG. 3A, the semiconductor device 300 can include a number of latches, e.g., 302_1 (Latch 1), 302_2 (Latch 2), 302_3 (Latch 3), 302_4 (Latch 4), . . . , 302_n–1 (Latch n–1), 302_n (Latch n) (referred to generally as latches 302 and individually as latch 302), where n is an integer larger than 1. The latches 302 can be coupled through a data bus 304 that can include one or more conductive lines (e.g., metal lines).

In some embodiments, the semiconductor device 300 includes a first integrated circuit 320 that can include a first plurality of latches, e.g., 302_1 (Latch 1), 302_3 (Latch 3), . . . , 302_n–1 (Latch n–1), and a second integrated circuit 330 that can include a second plurality of latches, e.g., 302_2 (Latch 2), 302_4 (Latch 4), . . . , 302_n (Latch n). Inside the first integrated circuit 320, the first plurality of latches can be conductively coupled through a first inner data bus 303 (e.g., one or more conductive lines), and thus data can be transferred between latches in the first integrated circuit 320 through the first inner data bus 303. Inside the second integrated circuit 330, the second plurality of latches can be conductively coupled through a second inner data bus 305 (e.g., one or more conductive lines), and thus data can be transferred between latches in the second integrated circuit 330 through the first inner data bus 305. The first inner data bus 303 and the second inner data bus 305 can be respectively coupled to the data bus 304, such that a latch in the first integrated circuit 320 can be conductively coupled to a latch in the second integrated circuit 330 through the data bus 304, and/or the first inner data bus 303 and/or the second inner data bus 305.

In some embodiments, the first integrated circuit 320 and the second integrated circuit 330 are in a same page buffer. The data bus 304 can be an internal data bus line (IDL) coupled to each of the first integrated circuit 320 and the second integrated circuit 330 and/or to each latch in the first integrated circuit 320 and the second integrated circuit 330. In some examples, the first integrated circuit 320 is a sensing latch circuit configured to sense data in one or more memory cells in the memory cell array, and the sensed data can be stored in one or more latches in the sensing latch circuit. The second integrated circuit 330 can be a storing latch circuit including one or more latches configured to store the sensed data transferred from the one or more latches in the sensing latch circuit. In some examples, the first integrated circuit 320 and the second integrated circuit 330 can both in the storing latch circuit, and data can be transferred between one or more latches in the first integrated circuit 320 and one or more latches in the second integrated circuit 330).

In some embodiments, the first integrated circuit 320 and the second integrated circuit 330 are in a same page buffer circuit. The data bus 304 can be an internal data bus in the page buffer circuit. The first integrated circuit 320 can include a first page buffer and the second integrated circuit 330 can include a second page buffer. Data can be transferred between one or more latches in the first page buffer and one or more latches in the second page buffer through the data bus 304.

In some embodiments, the first integrated circuit 320 is a page buffer circuit (e.g., the page buffer circuit 220 of FIG. 2) or a page buffer, and the second integrated circuit 330 is a cache circuit (e.g., the cache data latch circuit 230) or a cache, where the data bus 304 can be the data bus 240 of FIG. 2. In some embodiments, the first integrated circuit 320 is a data buffer (e.g., the data buffer 208 of FIG. 2), and the second integrated circuit 330 is a cache circuit (e.g., the cache data latch circuit 230), where the data bus 304 can be the data bus 250) of FIG. 2. In some embodiments, the first integrated circuit 320) and the second integrated circuit 330 are two caches in a same cache circuit, where the data bus 304 is an inner conductive line in the cache circuit.

Figure 3B:
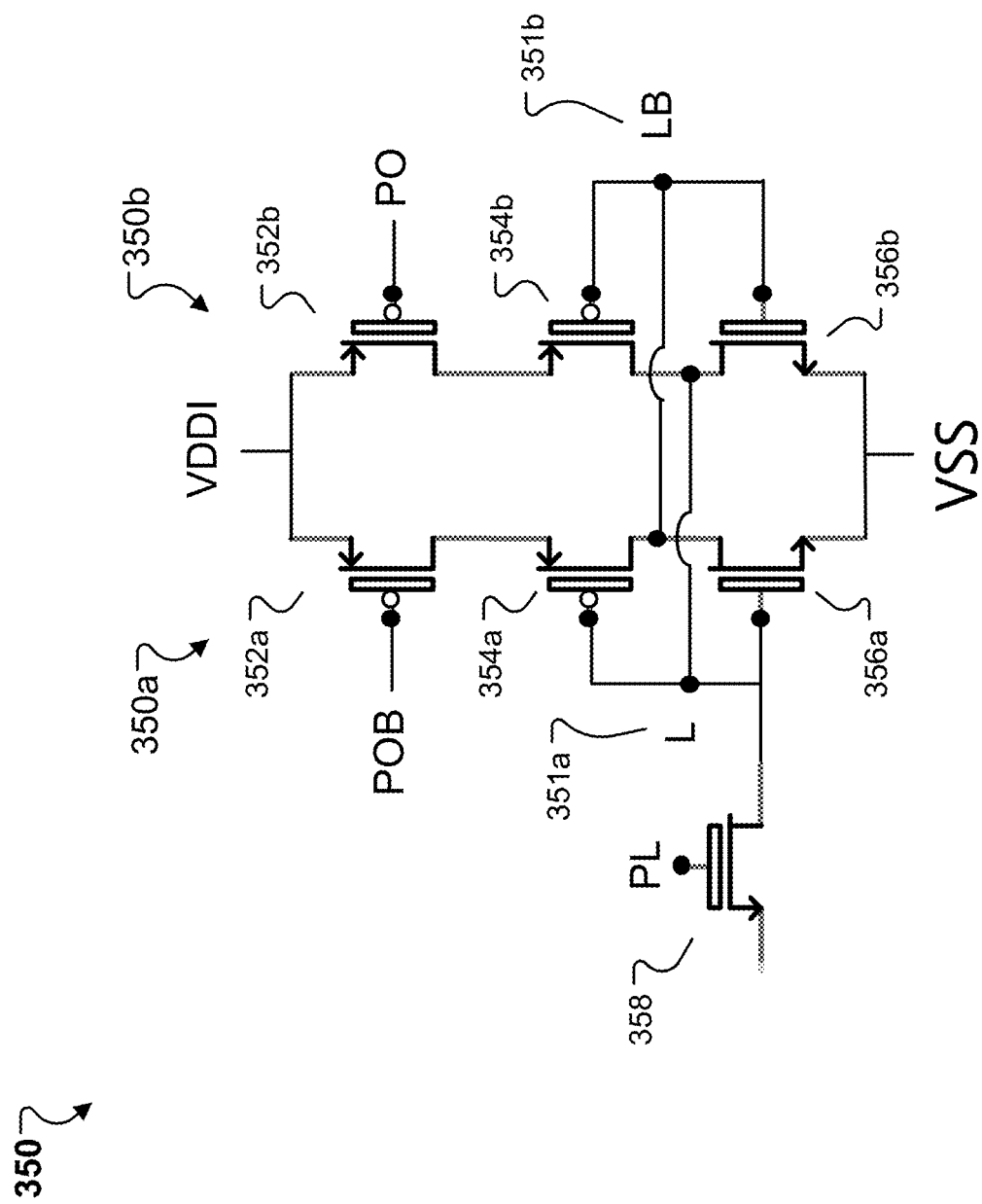
FIG. 3B shows a circuit diagram illustrating an example latch.

FIG. 3B shows a circuit diagram illustrating an example latch 350. The latch 350 can be the latch 302 of FIG. 3A, e.g., a latch in the first integrated circuit 320 or a latch in the second integrated circuit 330. The latch 350 can be a tri-state latch or a fighting latch. In some embodiments, the latch 350 is a unidirectional tri-state latch, which can reduce a total number of transistors in a semiconductor device such as the semiconductor device 300 of FIG. 3A, compared to other types of latches, while implementing data transfer as described in the present disclosure.

For example, in a NAND memory device, each bit line is coupled to a page buffer, and the page buffer can include a plurality of latches (e.g., 3). Each latch can include a number of MOS transistors. Reducing the number of MOS transistors (e.g., from 8 to 7) in each latch can greatly reduce the total number of MOS transistors in the page buffer, and further in the memory device, which can greatly reduce power consumption, and make the page buffer and/or the memory device compact.

As illustrated in FIG. 3B, the latch 350) includes a first side 350a and a second side 350b that are symmetric to each other. The first side 350a and the second side 350b are configured to receive a higher supply voltage VDDI at one end and a lower supply voltage VSS at the other end. The first side 350a can include a first p-type transistor 352a, a second p-type transistor 354a, and an n-type transistor 356a. The second side 350b can include a first p-type transistor 352b, a second p-type transistor 354b, and an n-type transistor 356b. The latch 350 can further include a control transistor 358 that can be another n-type transistor. A p-type transistor can be a PMOS transistor, and an n-type transistor can be an NMOS transistor.

For the first side 350a, the first p-type transistor 352a includes a first terminal for receiving the higher supply voltage VDDI, a second terminal coupled to the second p-type transistor 354a, and a gate terminal for receiving a control signal POB. The second p-type transistor 354a includes a first terminal coupled to the second terminal of the first p-type transistor 352a, a second terminal coupled to the n-type transistor 356a and also to a gate terminal of the n-type transistor 356b in the second side 350b, and a gate terminal coupled to a gate terminal of the first n-type transistor 356a and the control transistor 358. The n-type transistor 356a includes a first terminal coupled to the second terminal of the second p-type transistor 354a, a second terminal coupled to the lower supply voltage VSS, and the gate terminal to the gate terminal of the second p-type transistor 354a and also to a node between the transistors 354b, 356b in the second side 350b. The control transistor 358 includes a first terminal coupled to the gate terminal of the first n-type transistor 356a, a gate terminal for receiving a control signal PL, and a second terminal coupled out to a conductive line (e.g., a bit line such as the bit line 215 of FIG. 2 or a data bus such as the data bus 240 of FIG. 2, the data bus 303, the data bus 305, or the data bus 304 of FIG. 3A).

The second side 350b has a symmetric configuration as the first side 350a. The first p-type transistor 352b includes a first terminal for receiving the higher supply voltage VDDI, a second terminal coupled to the second p-type transistor 354b, and a gate terminal for receiving a control signal PO. The second p-type transistor 354b includes a first terminal coupled to the second terminal of the first p-type transistor 352b, a second terminal coupled to the n-type transistor 356b and also to a gate terminal of the n-type transistor 356a in the first side 350a, and a gate terminal coupled to a gate terminal of the n-type transistor 356b. The n-type transistor 356b includes a first terminal coupled to the second terminal of the second p-type transistor 354b, a second terminal coupled to the lower supply voltage VSS, and the gate terminal to the gate terminal of the second p-type transistor 354b and also to a node between the transistors 354a, 356a in the first side 350a.

A value corresponding to a voltage at LB node 351b coupled between the transistors 354b, 356b in the second side 350b is opposite to a value corresponding to a voltage at L node 351a coupled between the transistors 354a, 356a in the first side 350a and coupled to the control transistor 358. The latch 350 can be configured to store data by updating the value at the LB node 351b and/or the value at the L node 351a.

The latch 350 can be preset such that the value at the L node 351a represents bit "1" and the value at LB node 351b represents bit "0". If the conductive line coupling to the control transistor 358 has a high voltage level corresponding to bit "1", the value at the L node 351a remains at "1" when the control transistor 358 is turned on. If the data bus coupling to the control transistor 358 has a low voltage level corresponding to bit "0", the value at the L node 351a changes to "0" when the control transistor 358 is turned on. Bit "1" or "0" stored at the L node 351a in the latch 350 can be further transferred out to another latch or data unit. When the latch 350 is used to store new data, the latch 350 can be reset such that the value at the L node 351a represents bit "1" and the value at the LB node 351 represents bit "0". In such a way, the latch 350 can only flip once, e.g., from "1" to "0" at the L node 351a.

With continued reference to FIG. 3A, the semiconductor device 300 further includes a precharging circuit 310 coupled to the data bus 304 for precharging the data bus 304 to have a precharged voltage on the data bus 304 before data transfer between one or more latches in the first integrated circuit 320 and one or more latches in the second integrated circuit 330.

In some embodiments, as shown in FIG. 3A, the precharging circuit 310 includes a precharging transistor 312 that can be a p-type transistor. The precharging transistor 312 has a first terminal coupled to a supply voltage VPW, a second terminal coupled to the data bus 304, and a gate terminal configured to receive a control signal CHGB. The supply voltage VPW can be a controlled supply voltage based on an original supply voltage VDDI that can be larger than the controls supply voltage VPW. In some implementations, the precharging transistor 312 can be coupled to a control transistor that is configured to receive the original supply voltage VDDI at a first terminal and an enable signal at a gate terminal and output the controlled supply voltage VPW at a second terminal coupled to the precharging transistor 312. The control transistor can be turned on or off by the enable signal.

In some cases, parasitic capacitance may be formed between adjacent conductive lines (e.g., metal lines including the data bus 304) in the semiconductor device 300. For example, a page buffer can have a narrow and lengthy structure, which can cause adjacent metal lines to generate parasitic capacitance. A parasitic capacitance along the data bus 304 can be represented by an equivalent parasitic capacitor 306 that is coupled between the data bus 304 and a ground VSS, and has an equivalent capacitance Cparasitic, as shown in FIG. 3A.

As discussed with further details below (e.g., FIGS. 5 and 7), time for a data transfer operation (e.g., between latches through a data bus) includes a precharging time and a transferring time that both can be related to a parasitic capacitance (e.g., Cparasitic) along the data bus (e.g., the data bus 304) and a precharged voltage (e.g., VPW) on the data bus. A large parasitic capacitance can increase the transferring time. This phenomenon can become more severe with more bits stored in a memory cell, e.g., TLC, where more latches share a same data bus, which can length the transferring time.

Implementations of the present disclosure provide techniques that can decrease (or minimize) a precharged voltage on a data bus to decrease the precharging time and the transferring time and to thereby increase a data transfer speed and reduce power consumption, e.g., as discussed with further details in FIGS. 4A-4B, FIG. 5, FIGS. 6A-6B and FIG. 7. The techniques can also avoid cases where latches are reversely turned on or disturbed by a data bus with an insufficient voltage.

Example Integrated Circuits and Data Transfers

Figure 4A:
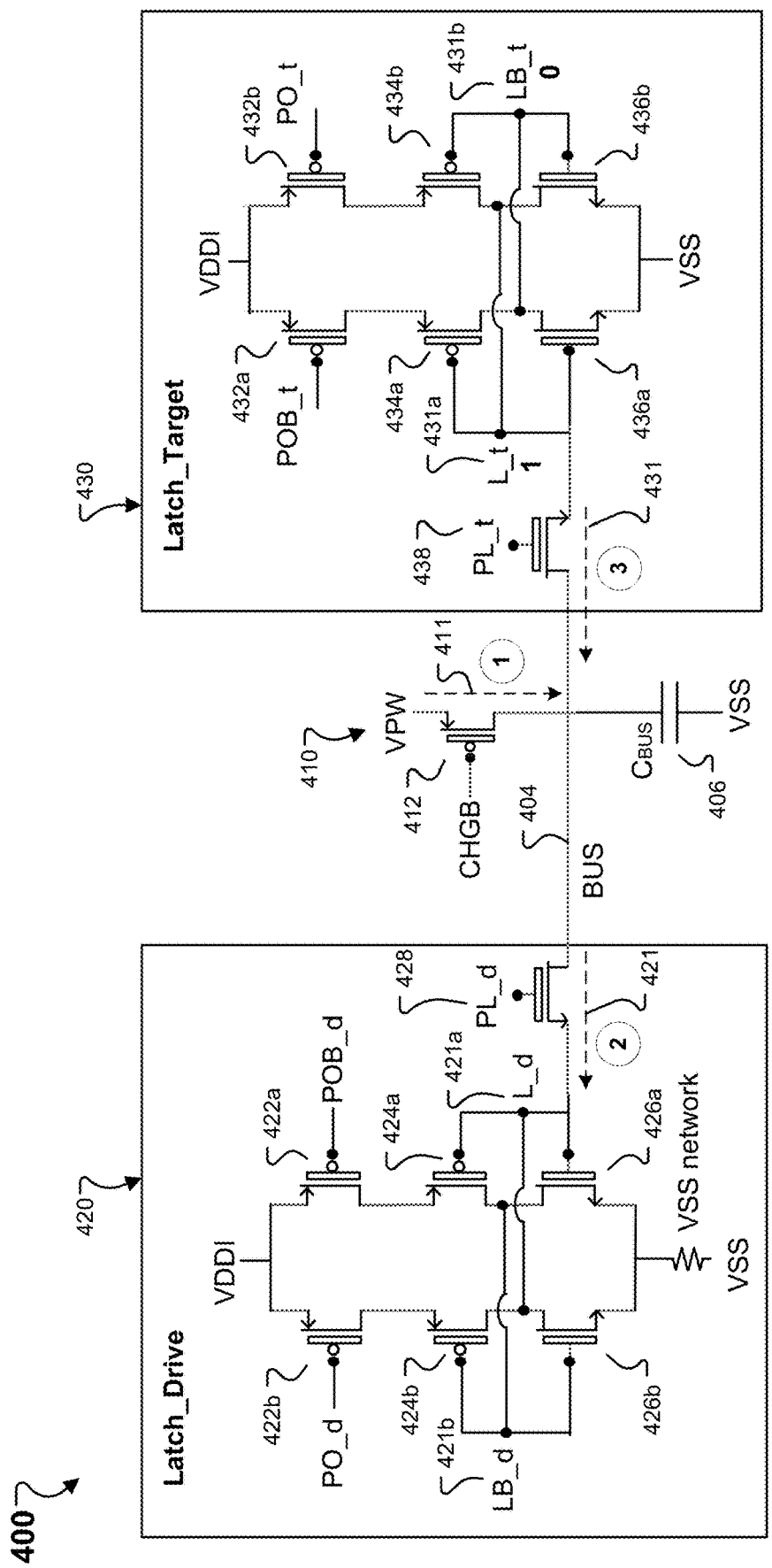
FIG. 4A illustrates an example data transfer between a drive latch and a target latch in an integrated circuit.

FIG. 4A illustrates an example data transfer between a drive latch 420 and a target latch 430 in an integrated circuit 400. Data can be transferred from the drive latch 420 to the target latch 430 through a data bus 404 (e.g., the data bus 304 of FIG. 3A).

The integrated circuit 400 can be included in a semiconductor device (e.g., the semiconductor device 300 of FIG. 3A or the memory device 200 of FIG. 2). In some embodiments, the integrated circuit 400 is a page buffer circuit (e.g., the page buffer circuit 220 of FIG. 2) or a cache circuit (e.g., the CDL circuit 230 of FIG. 2). The drive latch 420 and the target latch 430 are in different page buffers in the page buffer circuit or in different caches in the cache circuit. In some embodiments, the drive latch 420 and the target latch 430 are in a same page buffer. In some embodiments, the integrated circuit 400 includes a page buffer circuit and a cache circuit. One of the drive latch 420 and the target latch 430 is in the page buffer circuit and the other one of the drive latch 420 and the target latch 430 is in the cache circuit. In some embodiments, the integrated circuit 400 includes a cache circuit and a data buffer (e.g., the data buffer 208 of FIG. 2). One of the drive latch 420 and the target latch 430 is in the cache circuit and the other one of the drive latch 420 and the target latch 430 is in the data buffer. In some embodiments, the integrated circuit 400 includes a first circuit (e.g., 320) of FIG. 3A) that includes the drive latch 420 and a second circuit (e.g., 330 of FIG. 3A) that includes a target latch 430.

The integrated circuit 400 can further include a precharging circuit 410 (e.g., the precharging circuit 310 of FIG. 3A) coupled to the data bus 404 for precharging the data bus 404 before data transfer. The precharging circuit 410 includes a precharging transistor 412 (e.g., the precharging transistor 312 of FIG. 3A) that can be a p-type transistor. The precharging transistor 412 has a first terminal coupled to a supply voltage VPW, a second terminal coupled to the data bus 404, and a gate terminal configured to receive a control signal CHGB. The data bus 404 can be associated with an equivalent parasitic capacitor 406 (e.g., the capacitor 306 of FIG. 3A) having a parasitic capacitance $C_{BUS}$ (e.g., Cparasitic of FIG. 3A).

The drive latch 420 and the target latch 430 can have a same structure. Each of the drive latch 420 and the target latch 430 can be the latch 302 of FIG. 3A or the latch 350 of FIG. 3B. As shown in FIG. 4A, the drive latch 420 includes four p-type transistors 422a, 422b, 424a, 424b, two n-type transistors 426a, 426b, and a control transistor 428 coupled to the data bus 404. The drive latch 420 is coupled between a high supply voltage VDDI and a low supply voltage VSS. The target latch 430 includes four p-type transistors 432a, 432b, 434a, 434b, two n-type transistors 436a, 436b, and a control transistor 438 coupled to the data bus 404. The target latch 430 is also coupled between the high supply voltage VDDI and the low supply voltage VSS.

In the drive latch 420, data stored at node L_d 421a, e.g., bit "1" or "0", is to be transferred to the latch target 430, while node LB_d 421b stores data having a value opposite to the data stored at node L_d 421a, e.g., bit "0" or "1". The target latch 430 can be a unidirectional tri-state latch. As noted above, before the data is transferred, the target latch 430 is reset such that data stored at node L_t 431a is "1" and data stored at node LB_t 431b is "0".

Figure 5:
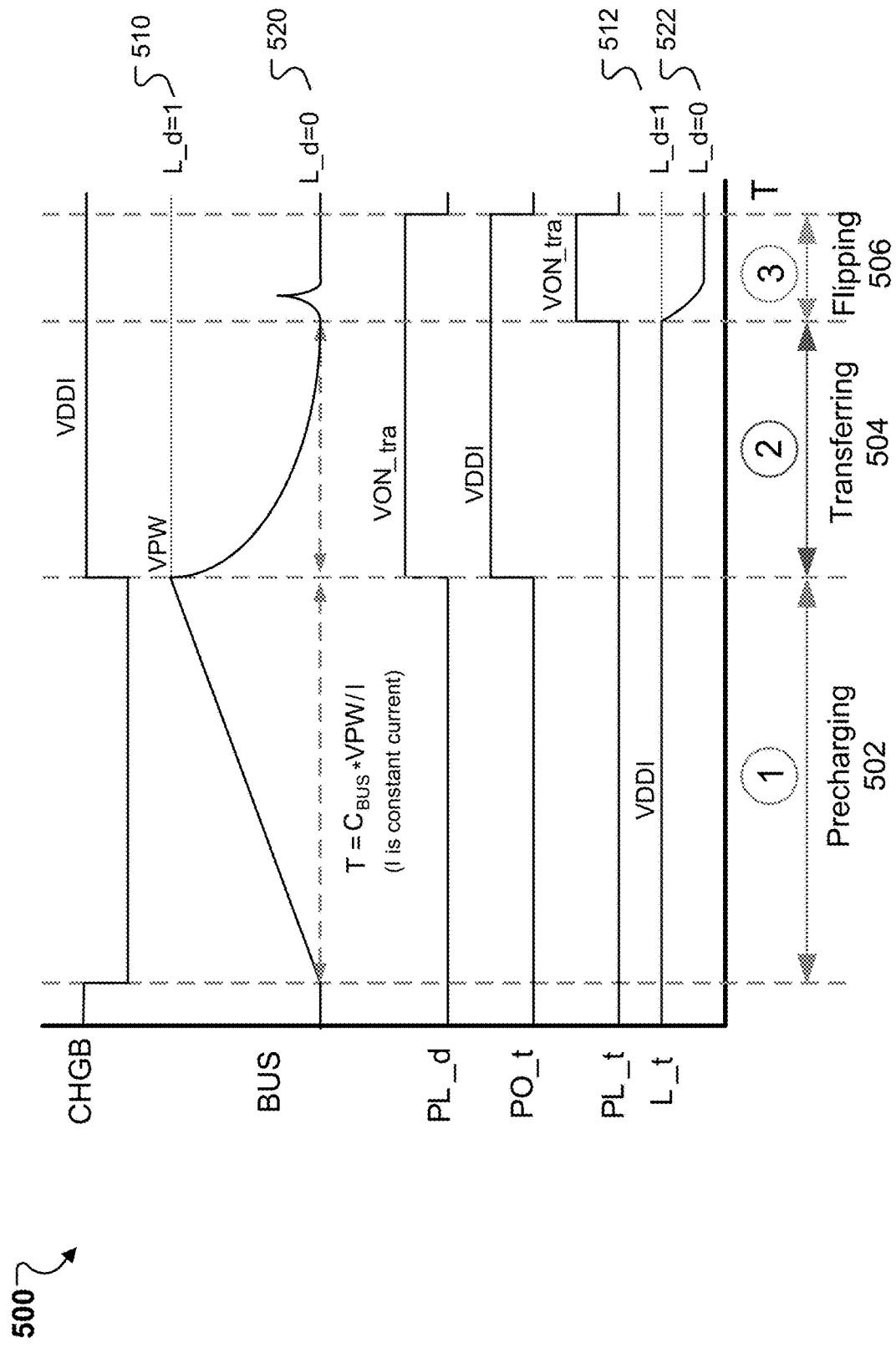
FIG. 5 shows a timing diagram illustrating voltage changes at different nodes of the integrated circuit of FIG. 4A during different operation phases.

FIG. 5 shows a timing diagram 500 illustrating voltage changes at different nodes of the integrated circuit of FIG. 4A during different operation phases of the data transfer, including a precharging phase 502, a transferring phase 504, and a flipping phase 506.

During the precharging phase 502, as shown in FIGS. 4A and 5, the data bus 404 is precharged by turning on the precharging transistor 412 with the control signal CHGB having a low voltage level. During the precharging phase 502, both the control transistor 428 in the drive latch 420 and the control transistor 438 in the target latch 430 are turned off by corresponding control signals PL_d and PL_t, e.g., at a low voltage level shown in FIG. 5. The p-type transistor 432b can be turned on by the control signal PO_t. e.g., at a low voltage level shown in FIG. 5, such that node L_t 431a can be kept at a high voltage level VDDI corresponding to bit "1", e.g., as shown in FIG. 5, by the supply voltage VDDI through the transistors 432b, 434b to the node L_t 431a.

Figure 7:
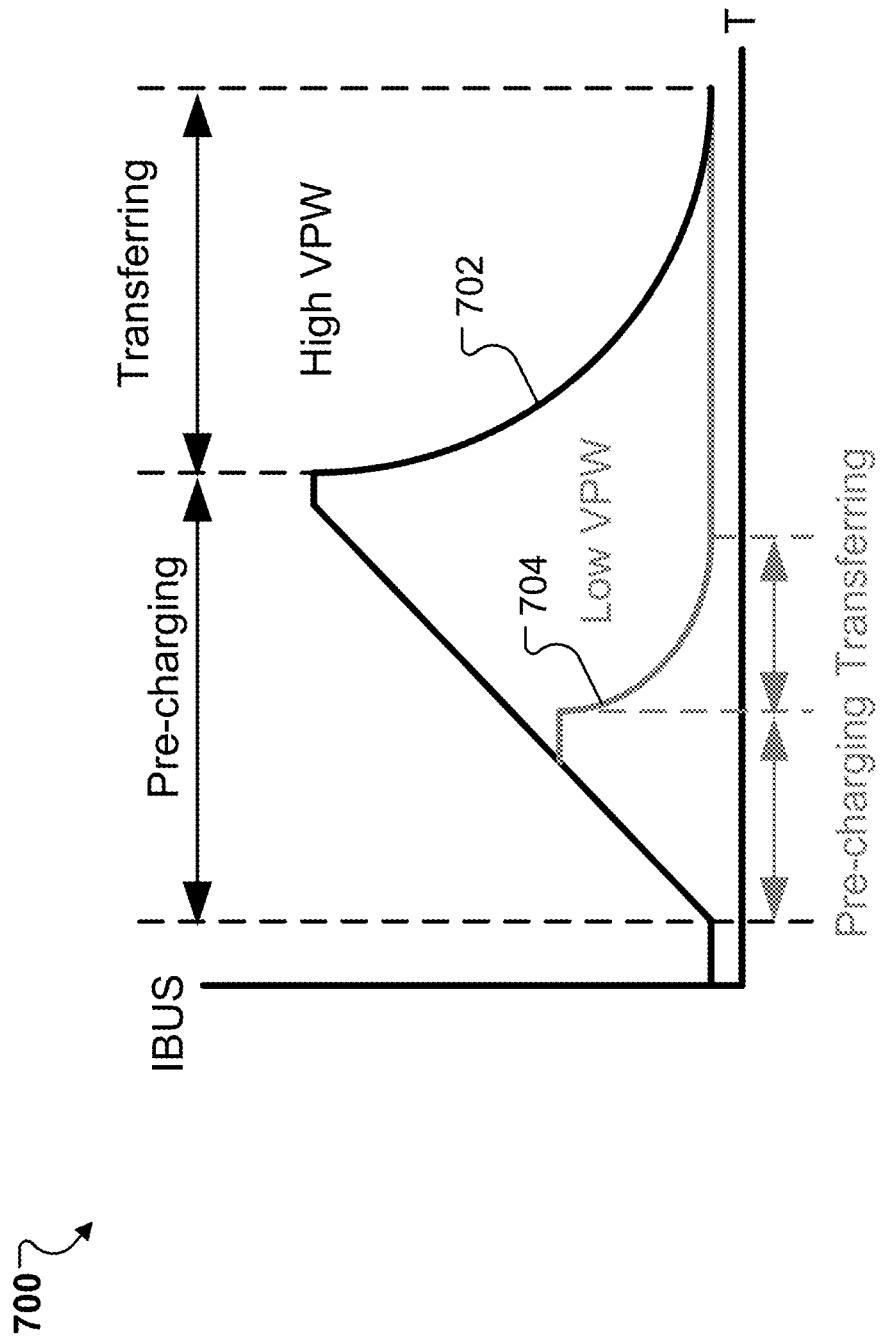
FIG. 7 shows comparison of precharging and transferring curves of data bus voltages with a higher charging voltage and a lower charging voltage.

The data bus 404 is precharged by the supply voltage VPW through the precharging transistor 412 along a first current path 411. The data bus 404 can be precharged to have a precharged voltage substantially identical to the supply voltage VPW. e.g., as shown in FIG. 5. Due to the parasitic capacitance $C_{BUS}$, the precharging time T can be determined by the parasitic capacitance $C_{BUS}$, and the precharged voltage VPW. In some cases, as shown in FIG. 5. T=$C_{BUS}$*VPW/I, where I is a precharging current along the first current path 411. The precharging current I can be a constant current that can be predetermined, such that the precharging time T can be proportional to $C_{BUS}$*VPW. As discussed with further details below (e.g., as illustrated in FIG. 7), a smaller precharged voltage (or the supply voltage VPW) on the data bus 404 can reduce the precharging time T.

During the transferring phase 504, the precharging transistor 412 is turned off by the control signal CHGB that is changed to a high voltage level VDDI. Meanwhile, the control transistor 428 in the drive latch 420 is turned on by the control signal PL_d with a first control voltage VON (e.g., a gate bias voltage). The control transistor 438 in the target latch 430 is still turned off by the control signal PL_t at the low voltage level. In the target latch 430, the p-type transistor 432b can be turned off by the control signal PO_t that is changed to a high voltage level VDDI, such that node L_t can be floating with a high voltage level corresponding to bit "1".

If data stored at node L_d 421a is bit "1", node L_d 421a has a high voltage level and the precharged voltage VPW on the data bus 404 remains unchanged, as shown by curve 510 in FIG. 5. If data stored at node L_d 421a is bit "0", node L_d 421a has a low voltage level and the precharged voltage VPW on the data bus 404 can be discharged along a second current path 421, as shown by curve 520 in FIG. 5. In such a way, a discharged voltage on the data bus 404 can correspond to the data stored at node L_d 421a, e.g., bit "0". The second current path 421 can go from the data bus 404 through the control transistor 428 and the transistor 426b to the low supply voltage VSS. The data bus 404, the control transistor 428, and the transistor 426b, and the low supply voltage VSS can form a VSS network. Due to the parasitic capacitance $C_{BUS}$ associated with the data bus 404, the voltage on the data bus 404 is discharged according to a RC response curve 520, e.g., as shown in FIG. 5. The discharging time can be determined by $C_{BUS}$*VPW. As discussed with further details below (e.g., as illustrated in FIG. 7), a smaller precharged voltage (or the supply voltage VPW) on the data bus 404 can reduce the transferring time.

During the flipping phase 506, as shown in FIGS. 4A and 5, the control transistor 438 in the target latch 430 is turned on by the control signal PL_t with a second control voltage VON (e.g., a gate bias voltage). The precharging transistor 412 can be still turned off, and the control transistor 428 in the drive latch 420 can be still turned on by the control signal PL_d with the first control voltage VON to be coupled to the low supply voltage VSS. The second control voltage VON can be same as or identical to the first control voltage VON.

As noted above, node L_t 431a has a floating high voltage corresponding to bit "1". If the data stored at node L_d 421a is bit "1", the precharged voltage VPW on the data bus 404 remains unchanged during the transferring phase 504, and accordingly, during the flipping phase 506, the precharged voltage VPW on the data bus 404 keeps unchanged and node L_t 431a is also kept at the high voltage corresponding to bit "1", as shown by curve 512 of FIG. 5. That is, the bit value "1" at node L_t 431a in the target latch 430 is same as the bit value "1" stored at node L_d 421*a* in the drive latch 420. Thus, the data is transferred from the drive latch 420 to the target latch 430.

If the data stored at node L_d 421*a* is bit "0", the precharged voltage VPW on the data bus 404 is discharged to a low discharged voltage during the transferring phase 504. Accordingly, during the flipping phase 506, as node L_t 431*a* has the high voltage corresponding to bit "1", a third current path 431 is formed from node L_t 431*a* through the control transistor 438, the data bus 404, the control transistor 428, the transistor 426*b*, to the low supply voltage VSS. Node L_t 421*a* can be discharged to have a low voltage corresponding to bit "0", e.g., as shown by curve 522 of FIG. 5. That is, the bit value "0" at node L_t 431*a* in the target latch 430 is same as the bit value "0" stored at node L_d 421*a* in the drive latch 420. Thus, the data is transferred from the drive latch 420 to the target latch 430. During the flipping phase 506, the data bus 404 can be first charged by the high voltage at node L_t 431*a* and then discharged to a low voltage corresponding to bit value "0", e.g., as shown by curve 520 of FIG. 5.

Figures 6A, 6B:
FIG. 6A illustrates an example relationship between voltages using a fixed control voltage.
FIG. 6B illustrates an example relationship between voltages using a tracking control voltage.

In some embodiments, the first control voltage and the second control voltage can be a fixed voltage VON, which can be used to address a variation of threshold voltage of the control transistor 428, 438. The variation can be caused by process variation and/or temperature variation. As illustrated in FIG. 6A, the fixed voltage VON needs to have a value greater than or identical to a sum of voltage VOD and a maximum value of the threshold voltage of the control transistor $Vth_{max}$, e.g., $VON>=VOD+Vth_{max}$. The voltage VOD is an overdrive voltage for discharging the data bus 404 during the transferring phase 504 and/or for flipping the target latch 430 during the flipping phase 506. In some cases, the overdrive voltage VOD is about 200~300 mV. A large overdrive voltage VOD can increase a transferring speed. However, when the voltage VOD is larger than a threshold voltage, e.g., 300 mV, the discharging speed or the transferring speed of the data bus 404 is mainly limited by the VSS network in the drive latch 420.

In some cases, if the precharged voltage VPW on the data bus 404 is too low, during the transferring phase 504, the control transistor 428 in the drive latch 420 can be reversely turned on along a current path from the supply voltage VDDI through the transistors 422*b*, 424*b* to the control transistor 428. In some cases, if the precharged voltage VPW on the data bus 404 is too low and when data stored at node L_t 431*a* is bit "1", during the flipping phase 506, a current path can be formed from node L_t 431*a* through the control transistor 438 to the data bus 404, and the voltage at node L_t 431*a* may decrease, which may change corresponding bit "1" stored in node L_t 431*a*.

To prevent the control transistor 428 in the drive latch 420 from being reversely turned on during the transferring phase 504 and also to prevent the target latch 430 from being disturbed by insufficient voltage on the data bus 404 during the flipping phase 506, the precharged voltage VPW on the data bus 404 needs to be greater than or identical to a sum of the overdrive voltage VOD and a difference between the minimum value $Vth_{min}$ (e.g., at fast corner) and the maximum value $Vth_{max}$ (e.g., at slow corner) of the threshold voltage of the control transistor 428, 438, e.g., $VPW>=VOD+\Delta V$ and $\Delta V=Vth_{max}-Vth_{min}$, as shown in FIG. 6A.

In a particular example, the overdrive voltage VOD is about 300 mV, and the threshold voltage of the control transistor Vth varies between 500 mV to 1 V. Thus, the control voltage VON needs to be greater than or identical to 1.3 V, and the precharged voltage VPW on the data bus 404 needs to be greater than or identical to 800 mV.

As curves 702 and 704 shown in FIG. 7, a high precharged voltage VPW at a data bus can cause large precharging time and large transferring time during data transfer, while a low precharged voltage VPW on the data bus can greatly reduce the precharging time and the transferring time, which can also reduce power consumption.

In some embodiments, a value of a precharged voltage VPW on a data bus can be minimized or decreased by providing a predetermined voltage to charge the data bus and by applying a tracking control voltage based on a variation of a control transistor to the control transistor. The predetermined voltage can be an overdrive voltage VOD, as noted above. The tracking control voltage can be a sum of the predetermined voltage and a tracked threshold voltage of the control transistor.

As illustrated in FIG. 6B, the precharged voltage VPW on the data bus can be identical to the overdrive voltage VOD that can be a predetermined voltage. Different from the fixed control voltage VON in FIG. 6A, the tracking control voltage VON_tra, as the sum of the overdrive voltage VOD and the threshold voltage Vth of the control transistor, can dynamically track the change of the threshold voltage of the control transistor, e.g., due to process and temperature variation. In such a way, the precharged voltage VPW on the data bus can be reduced to be the overdrive voltage VOD, e.g., 300 mV, which can further reduce the precharging time and the transferring time of data transfer and power consumption.

Figure 4B:
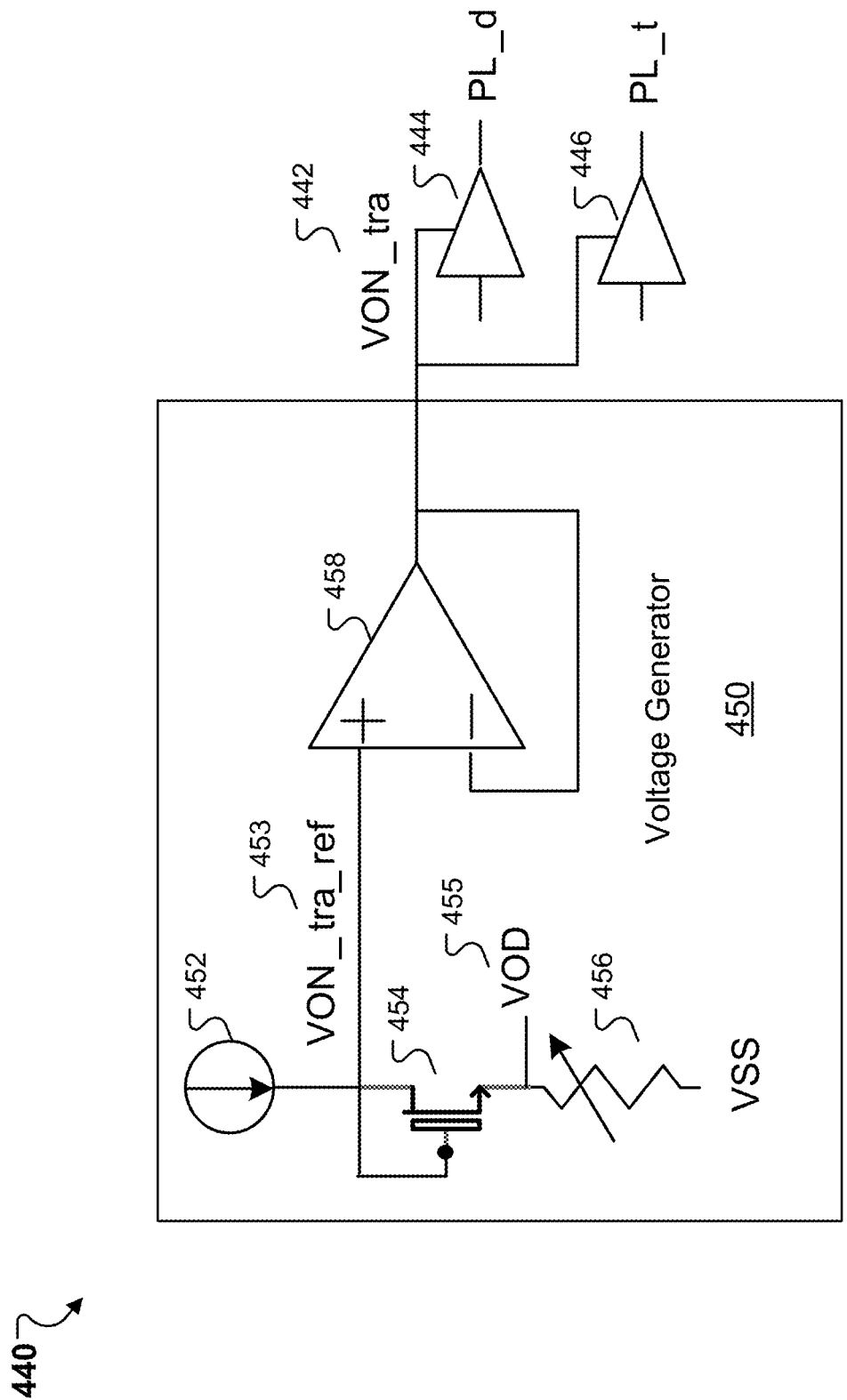
FIG. 4B shows a circuit diagram illustrating an example voltage generator for generating a tracking control voltage.

FIG. 4B shows a circuit diagram 440 illustrating an example voltage generator 450) for generating a tracking control voltage VON_tra. The voltage generator 450 can be included in the integrated circuit 400 or externally coupled to the integrated circuit 400. The voltage generator 450) includes a reference transistor 454 that can be substantially same as the control transistor 428, 438, e.g., fabricated under same conditions and/or in a same batch, such that a variation of a threshold voltage (or a threshold voltage variation) of the reference transistor 454 can be substantially same as that of the control transistor 428, 438. The reference transistor 454 can be an n-type transistor (e.g., NMOS transistor).

In some embodiments, as shown in FIG. 4B, the reference transistor 454 has a first terminal coupled to a current source 452 for providing a constant current I, a second terminal coupled to a resistor 456 that is coupled to a low voltage VSS, and a gate terminal coupled to the first terminal. A voltage at the gate terminal is considered as (or represents) a reference voltage VON_tra_ref 453. The voltage 455 at the second terminal of the reference transistor 454 can be identical to the overdrive voltage VOD. The voltage 455 can be a multiplication of the constant current I from the current source 452 and a resistance of the resistor 456. The voltage 455 can be used as the supply voltage VPW to be provided to the precharging transistor 412. Thus, the reference voltage VON_tra_ref 453 can be a sum of the voltage 455 (e.g., VOD) and a threshold voltage of the reference transistor 454. e.g., VOD+Vth.

In some embodiments, the voltage generator 450) includes an operational amplifier 458 coupled to the first terminal of the reference transistor 454 and configured to receive the reference voltage VON_tra_ref 453. The operational amplifier 458 can be a voltage follower or a unity gain amplifier that has a gain of 1. For example, the operational amplifier 458 has a positive input for receiving the reference voltage VON_tra_ref 453 and a negative input coupled to an output for outputting a tracking control voltage VON_tra 442 that can be substantially identical to the reference voltage VON_tra_ref 453. Thus, the tracking control voltage VON_tra 442 can be substantially identical to a sum of the voltage 455 (e.g., VOD) and a threshold voltage of the reference transistor 454. e.g., VOD+Vth, which can track a variation of the threshold voltage of the reference transistor 454 that can be substantially identical to a variation of the threshold voltage of the control transistor 428, 438.

The tracking control voltage VON_tra 442 can be provided to the control transistor 428 and the control transistor 438 during the data transfer. e.g., as shown in FIG. 5. In some embodiments, as shown in FIG. 4B, the integrated circuit 400 can include a first logic gate 444 and a second logic gate 446 both coupled to the output of the operational amplifier 458 for receiving the tracking control voltage VON_tra 442.

The first logic gate 444 can have a first logic input coupled to the output of the operational amplifier 458 and a first logic output coupled to the gate terminal of the control transistor 428 to provide a control signal PL_d. The first logic gate 444 can be further controlled by a logic control signal (e.g., at another input of the first logic gate 444) to provide the tracking control voltage VON_tra 442 during the transferring phase 504 and the flipping phase 506, but not during the precharging phase 502. The second logic gate 446 can have a first logic input coupled to the output of the operational amplifier 458 and a first logic output coupled to the gate terminal of the control transistor 438 to provide a control signal PL_t. The second logic gate 446 can be further controlled by a logic control signal to provide the tracking control voltage VON_tra 442 during the flipping phase 506, but not during the precharging phase 502 and not during the transferring phase 504.

As noted above, a larger overdrive voltage VOD can increase data transferring speed if VOD is no greater than a threshold voltage (e.g., 300 mV), and a smaller precharged voltage VPW can reduce the precharging time and the transferring time to thereby increase the data transferring speed. The voltage 455 at the second terminal of the reference transistor 454 can be the overdrive voltage VOD and the precharged voltage VPW. Thus, the voltage 455 can be determined by considering both of the above factors.

In some embodiments, as shown in FIG. 4B, the resistance of the resistor 456 can be adjustable, such that the voltage 455 can be adjusted correspondingly, e.g., varying in a range from 200 mV to 400 mV. A trade-off or optimum value of the voltage 455 can be determined by a comparison of response times of data transfer with different resistances of the resistor 456.

Example Process

Figure 8:
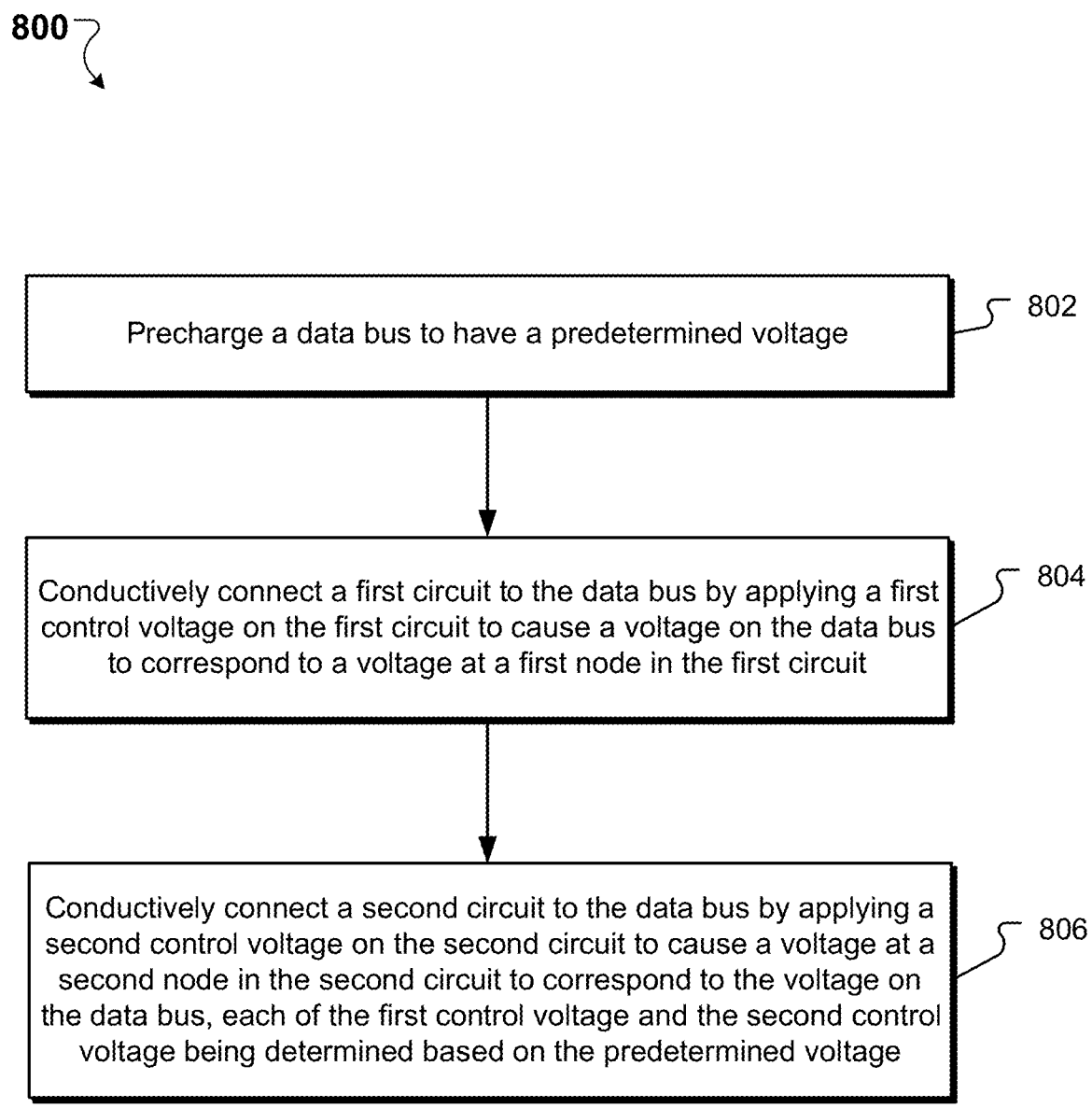
FIG. 8 is a flow chart of an example process for managing data transfer in an integrated circuit.

FIG. 8 is a flow chart of an example process 800 for managing data transfer in an integrated circuit. The integrated circuit can be included in a semiconductor device (e.g., the semiconductor device 300 of FIG. 3A or the memory device 200 of FIG. 2). The integrated circuit can be the integrated circuit 400 of FIGS. 4A-4B.

The integrated circuit can include a first circuit (e.g., the drive latch 420 of FIG. 4A), a second circuit (e.g., the target latch 430 of FIG. 4A), and a data bus (e.g., the data bus 404 of FIG. 4A) coupled to each of the first circuit and the second circuit. Each of the first circuit can the second circuit can be a unidirectional tri-state latch (e.g., the latch 350 of FIG. 3B).

In some embodiments, the integrated circuit includes a page buffer circuit (e.g., the page buffer circuit 220 of FIG. 2) or a cache circuit (e.g., the CDL circuit 230 of FIG. 2). The first circuit and the second circuit are latches in different page buffers in the page buffer circuit or caches in different caches in the cache circuit. In some embodiments, the integrated circuit 400 includes a page buffer circuit and a cache circuit. One of the first circuit and the second circuit is in the page buffer circuit and the other one of the first circuit and the second circuit is in the cache circuit. In some embodiments, the first circuit and the second circuit are in a same page buffer. Each of the first circuit and the second latch can include one or more latches in the same page buffer.

The integrated circuit can further include a precharging circuit (e.g., the precharging circuit 310 of FIG. 3A or 410 of FIG. 4A) coupled to the data. The precharging circuit includes a precharging transistor (e.g., the precharging transistor 312 of FIG. 3A or 412 of FIG. 4A) that can be a p-type transistor. The precharging transistor can have a first terminal coupled to a supply voltage VPW, a second terminal coupled to the data bus, and a gate terminal configured to receive a control signal (e.g., CHGB). The data bus can be associated with an equivalent parasitic capacitor (e.g., the capacitor 306 of FIG. 3A or 406 of FIG. 4A) having a parasitic capacitance (e.g., Cparasitic of FIG. 3A or $C_{BUS}$ of FIG. 4A).

At 802, the data bus is precharged by the precharging circuit to have a predetermined voltage, e.g., as illustrated in the precharging phase 502 of FIG. 5. The precharging circuit can precharge the data bus at a constant current along a current path, e.g., the first current path 411 of FIG. 4A.

After the data bus is precharged, at 804, the first circuit is conductively connected to the data bus by applying a first control voltage on the first circuit to cause a voltage on the data bus to correspond to a voltage at a first node in the first circuit, e.g., as illustrated in the transferring phase 504 of FIG. 5.

At 806, the second circuit is conductively connected to the data bus by applying a second control voltage on the second circuit to cause a voltage at a second node in the second circuit to correspond to the voltage on the data bus, e.g., as illustrated in the flipping phase 506 of FIG. 5. Each of the first control voltage and the second control voltage is determined based on the predetermined voltage.

In some embodiments, the predetermined voltage is a fixed voltage (e.g., VOD), and each of the first control voltage and the second control voltage can be determined further by tracking a variation of the at least one of the first circuit or the second circuit, e.g., as shown in FIG. 4B.

In some embodiments, the first circuit includes a first control transistor (e.g., the control transistor 428 of FIG. 4A) configured to receive a first control signal (e.g., PL_d of FIGS. 4A-4B), and the second circuit includes a second control transistor (e.g., the control transistor 438 of FIG. 4A) configured to receive a second control signal (e.g., PL_t of FIGS. 4A-4B). The first control signal is configured to turn on the first control transistor with a first control voltage such that the first circuit is conductively coupled to the data bus, and the second control signal is configured to turn on the second control transistor with a second control voltage such that the second circuit is conductively coupled to the data bus, e.g., as illustrated in FIG. 5.

In some embodiments, the first control transistor has a first terminal coupled to the data bus, a second terminal coupled to a first node in the first circuit, and a first gate terminal configured to receive the first control signal, and the second control transistor has a first terminal coupled to the data bus, a second terminal coupled to a second node in the second circuit, and a second gate terminal configured to receive the second control signal.

In some embodiments, each of the first control voltage and the second control voltage is determined by tracking a variation of a threshold voltage of a reference transistor (e.g., the reference transistor 454 of FIG. 4B). Each of the first control transistor and the second control transistor can have a threshold voltage substantial same as the threshold voltage of the reference transistor.

In some embodiments, the integrated circuit includes a voltage generator (e.g., the voltage generator 450 of FIG. 4B) including the reference transistor. The voltage generator is configured to generate the first control voltage and the second control voltage based on the threshold voltage of the reference transistor.

In some embodiments, the reference transistor includes a first terminal coupled to a current source (e.g., the current source 452 of FIG. 4B), a second terminal coupled to a resistor (e.g., the resistor 456 of FIG. 4B), and a gate terminal coupled to the first terminal. The predetermined voltage can be identical to a voltage (e.g., voltage 455 of FIG. 4B) at the second terminal that is based on a resistance of the resistor and a current from the current source to the resistor. A reference voltage at the gate terminal (e.g., VON_tra_ref 453 of FIG. 4B) can be a sum of the voltage at the second terminal (e.g., VOD) and the threshold voltage of the reference transistor (Vth). The current from the current source to the resistor can be a constant current.

In some embodiments, the voltage generator further includes an operational amplifier (e.g., the operational amplifier 458 of FIG. 4B) coupled to the gate terminal of the reference transistor. The operational amplifier can be configured to output a tracking voltage (e.g., VON_tra 442 of FIG. 4B) based on the reference voltage. In some examples, the operational amplifier includes a voltage follower or a unity gain amplifier, and the tracking voltage is substantially identical to the reference voltage.

In some embodiments, the integrated circuit further includes: a first logic gate (e.g., the first logic gate 444 of FIG. 4B) having a first logic input coupled to an output of the operational amplifier and a first logic output coupled to a first gate terminal of the first control transistor, and a second logic gate (e.g., the second logic gate 446 of FIG. 4B) having a second logic input coupled to the output of the operational amplifier and a second logic output coupled to a second gate terminal of the second control transistor. Each of the first control voltage and the second control voltage can be substantially identical to the tracking voltage.

In some embodiments, the resistance of the resistor is adjustable, and the predetermined voltage is determined based on a result of adjusting the resistance of the resistor, e.g., by a comparison of response times of data transfer between the first circuit and the second circuit through the data bus with different resistances of the resistor. A response time of data transfer is determined based on the predetermined voltage and a parasitic capacitance associated with the data bus.

In some embodiments, the integrated circuit is configured to transfer the data from the first circuit to the second circuit such that a voltage at a second node (e.g., L_t 431a of FIG. 4A) coupled to the second control transistor in the second circuit represents a same value as a voltage at a first node (e.g., L_d 421a of FIG. 4A) coupled to the first control transistor in the first circuit.

In some embodiments, before the data is transferred, the second circuit is configured to be reset such that the voltage at the second node in the second circuit represents a bit value "1". For example, the second circuit can be a unidirectional tri-state latch.

In some embodiments, after the data bus is charged by the precharging circuit to have the predetermined voltage, the first control transistor is turned on by the first control signal with the first control voltage, such that, e.g., as illustrated in FIG. 5, the predetermined voltage on the data bus is discharged if the voltage at the first node represents a bit value "0", or the predetermined voltage on the data bus remains unchanged if the voltage at the first node represents the bit value "1".

In some embodiments, after the voltage of the first node is stable, the second control transistor is turned on by the second control signal with the second control voltage, such that, e.g., as illustrated in FIG. 5, the voltage at the second node in the second circuit is discharged to a voltage representing the bit value "(" if the data bus has a discharged voltage corresponding to the voltage of the first node representing the bit value "0", or the voltage at the second node remains unchanged if the data bus remains at the predetermined voltage corresponding to the voltage of the first node representing the bit value "1".

In some embodiments, the second circuit is configured to maintain the voltage at the second node representing the bit value "1" by conductively connecting the second node to a supply voltage, and before the second control transistor is turned on, conductively isolate the second node from the supply voltage to cause the second node to float with the voltage representing the bit value "1", e.g., as illustrated in FIG. 5.

In some embodiments, data transfer can be performed in a semiconductor device (e.g., the memory device 200 of FIG. 2 or the semiconductor device 300 of FIG. 3A). The semiconductor device can include a plurality of latches (e.g., latch 302 of FIG. 3A), a data bus (e.g., the data bus 304 of FIG. 3A) coupled to each of the plurality of latches, and a precharging circuit (e.g., the precharging circuit 310 of FIG. 3A) coupled to the data bus. The precharging circuit is configured to precharge the data bus to have a predetermined voltage (e.g., VOD) before data is transferred from a first latch (e.g., the drive latch 420 of FIG. 4A) to a second latch (e.g., the target latch 430 of FIG. 4A) among the plurality of latches. At least one of the first latch or the second latch is conductively coupled to the data bus by applying a control voltage to the at least one of the first latch or the second latch, the control voltage being determined based on the predetermined voltage.

In some embodiments, the predetermined voltage is a fixed voltage, and the control voltage is determined further by tracking a variation of the at least one of the first latch or the second latch. In some embodiments, the first latch includes a first control transistor (e.g., the control transistor 428 of FIG. 4A) coupled to the data bus and configured to receive a first control signal with a first control voltage (e.g., PL_d of FIGS. 4A-4B) to turn on the first control transistor. The second latch includes a second control transistor (e.g., the control transistor 438 of FIG. 4A) coupled to the data bus and configured to receive a second control signal (e.g., PL_t of FIGS. 4A-4B) with a second control voltage to turn on the second control transistor. Each of the first control voltage and the second control voltage can be determined based on the predetermined voltage and by tracking a variation of a reference transistor (e.g., the reference transistor 454 of FIG. 4B). Each of the first control transistor and the second control transistor can have a threshold voltage substantial same as the threshold voltage of the reference transistor.

In some embodiments, the semiconductor device further includes a voltage generator (e.g., the voltage generator 450) of FIG. 4B) including the reference transistor. The reference transistor comprises a first terminal coupled to a current source (e.g., the current source 452 of FIG. 4B), a second terminal coupled to a resistor (e.g., the resistor 456 of FIG. 4B), and a gate terminal coupled to the first terminal. The predetermined voltage can be identical to a voltage (e.g., voltage 455 of FIG. 4B) at the second terminal that is based on a resistance of the resistor and a current from the current source to the resistor. A reference voltage at the gate terminal (e.g., VON_tra_ref 453 of FIG. 4B) can be a sum of the voltage at the second terminal and the threshold voltage of the reference transistor. Each of the first control voltage and the second control voltage can be based on the reference voltage.

In some embodiments, the voltage generator further includes an operational amplifier (e.g., the operational amplifier 458 of FIG. 4B) coupled to the gate terminal of the reference transistor and configured to output a tracking voltage (e.g., VON_tra 442 of FIG. 4B) based on the reference voltage.

In some embodiments, the semiconductor device further includes: a first logic gate (e.g., the first logic gate 444 of FIG. 4B) having a first logic input coupled to an output of the operational amplifier and a first logic output coupled to the first control transistor, and a second logic gate (e.g., the second logic gate 446 of FIG. 4B) having a second logic input coupled to the output of the operational amplifier and a second logic output coupled to the second control transistor. Each of the first control voltage and the second control voltage can be substantially identical to the tracking voltage.

In some embodiments, the semiconductor device includes a page buffer circuit (e.g., the page buffer circuit 220 of FIG. 2) including the plurality of latches and the data bus. In some embodiments, the semiconductor device includes a page buffer circuit (e.g., the page buffer circuit 220 of FIG. 2) including the first latch and a cache circuit (e.g., the CDL circuit 230 of FIG. 2) including the second latch. The cache circuit is coupled to the page buffer circuit through the data bus. In some embodiments, the semiconductor device further includes a memory cell array (e.g., the memory cell array 210 of FIG. 2) for storing data in memory cells, and the page buffer circuit is coupled to the memory cell array, e.g., through bit lines such as the bit lines 215 of FIG. 2.

The disclosed and other examples can be implemented as one or more computer program products, for example, one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry. e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data. e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices. e.g., EPROM. EEPROM, and flash memory devices: magnetic disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. An integrated circuit, comprising:
   a first circuit having a first node for receiving a higher supply voltage and a second node for receiving a lower supply voltage;
   a data bus coupled to the first circuit; and
   a precharging circuit coupled to the data bus,
   wherein the precharging circuit comprises:
      a power control transistor having a first terminal configured to receive the higher supply voltage, a second terminal configured to output a predetermined voltage, and a gate terminal configured to an enable signal, wherein the power control transistor is configured to generate the predetermined voltage based on the higher supply voltage when the enable signal turns on the power control transistor, and wherein the predetermined voltage is smaller than the higher supply voltage and greater than the lower supply voltage, and
      a precharging transistor coupled to the power control transistor, the precharging transistor having a first terminal configured to receive the predetermined voltage from the power control transistor, a second terminal connected to the data bus, and a gate terminal configured to receive a precharging control signal,
   wherein the precharging circuit is configured to precharge the data bus to have the predetermined voltage before data is transferred through the data bus,
   wherein the first circuit comprises a first control transistor having a first terminal connected to the data bus and a gate terminal configured to receive a first control voltage, and
   wherein the first circuit is conductively coupled to the data bus by applying the first control voltage to the first circuit, the first control voltage being determined based on the predetermined voltage.

2. The integrated circuit of claim 1, wherein the predetermined voltage is a fixed voltage, and the first control voltage is determined further by tracking a variation of a threshold voltage of a transistor in the first circuit.

3. The integrated circuit of claim 1, further comprising a second circuit coupled to the data bus,
   wherein the precharging circuit is configured to precharge the data bus to have the predetermined voltage before the data is transferred between the first circuit and the second circuit through the data bus.

4. The integrated circuit of claim 3, wherein the first circuit comprises the first control transistor configured to receive a first control signal, and the second circuit comprises a second control transistor configured to receive a second control signal,
   wherein the first control signal is configured to turn on the first control transistor with the first control voltage to cause the first circuit to be conductively coupled to the data bus, and the second control signal is configured to turn on the second control transistor with a second control voltage to cause the second circuit to be conductively coupled to the data bus, and
   wherein the second control voltage is determined based on the predetermined voltage.

5. The integrated circuit of claim 4, wherein each of the first control voltage and the second control voltage is determined by tracking a variation of a threshold voltage of a reference transistor, and
   wherein a variation of a threshold voltage of each of the first control transistor and the second control transistor is substantially same as the variation of the threshold voltage of the reference transistor.

6. The integrated circuit of claim 5, further comprising a voltage generator including the reference transistor,
   wherein the voltage generator is configured to generate the first control voltage and the second control voltage based on the threshold voltage of the reference transistor.

7. The integrated circuit of claim 6, wherein the reference transistor comprises a first terminal coupled to a current source, a second terminal coupled to a resistor, and a gate terminal coupled to the first terminal,
   wherein the predetermined voltage corresponds to a voltage at the second terminal that is based on a resistance of the resistor and a current from the current source to the resistor,
   wherein a reference voltage at the gate terminal is a sum of the voltage at the second terminal and the threshold voltage of the reference transistor, and
   wherein each of the first control voltage and the second control voltage is based on the reference voltage.

8. The integrated circuit of claim 7, wherein the voltage generator further comprises an operational amplifier coupled to the gate terminal of the reference transistor,
   wherein the operational amplifier is configured to output a tracking voltage based on the reference voltage, and
   wherein each of the first control voltage and the second control voltage is based on the tracking voltage.

9. The integrated circuit of claim 7, wherein the resistance of the resistor is adjustable, and wherein the predetermined voltage is determined based on a result of adjusting the resistance of the resistor.

10. The integrated circuit of claim 4, wherein the integrated circuit is configured to transfer the data from the first circuit to the second circuit to cause a voltage at a second node coupled to the second control transistor in the second circuit to represent a same value as a voltage at a first node coupled to the first control transistor in the first circuit.

11. The integrated circuit of claim 10, wherein, before the data is transferred, the second circuit is configured to be reset to cause the voltage at the second node in the second circuit to represent a bit value "1".

12. The integrated circuit of claim 11, wherein, after the data bus is charged by the precharging circuit to have the predetermined voltage, the first control transistor is turned on by the first control signal with the first control voltage, and
   wherein the predetermined voltage on the data bus is discharged if the voltage at the first node represents a bit value "0", or the predetermined voltage on the data bus remains unchanged if the voltage at the first node represents the bit value "1".

13. The integrated circuit of claim 12, wherein, after the voltage of the first node is stable, the second control transistor is turned on by the second control signal with the second control voltage, and
   wherein:
      the voltage at the second node in the second circuit is discharged to a voltage representing the bit value "0"

if the data bus has a discharged voltage corresponding to the voltage of the first node representing the bit value "0", or the voltage at the second node remains unchanged if the data bus remains at the predetermined voltage corresponding to the voltage of the first node representing the bit value "1".

14. The integrated circuit of claim 13, wherein the second circuit is configured to:

maintain the voltage at the second node representing the bit value "1" by conductively connecting the second node to a supply voltage, and before the second control transistor is turned on, conductively isolate the second node from the supply voltage to cause the second node to float with the voltage representing the bit value "1".

15. The integrated circuit of claim 3, comprising a page buffer circuit, wherein the page buffer circuit comprises the first circuit as a first latch, the second circuit as a second latch, and the data bus.

16. The integrated circuit of claim 3, comprising:

a page buffer circuit including the first circuit as a first latch, and a cache circuit including the second circuit as a second latch.

17. A semiconductor device, comprising:

a plurality of latches comprising a first latch and a second latch, wherein each of the first latch and the second latch has a first node for receiving a higher supply voltage and a second node for receiving a lower supply voltage;

a data bus coupled to each of the plurality of latches; and a precharging circuit coupled to the data bus, wherein the precharging circuit comprises:

a power control transistor having a first terminal configured to receive the higher supply voltage, a second terminal configured to output a predetermined voltage, and a gate terminal configured to an enable signal, wherein the power control transistor is configured to generate the predetermined voltage based on the higher supply voltage when the enable signal turns on the power control transistor, and wherein the predetermined voltage is smaller than the higher supply voltage and greater than the lower supply voltage, and a precharging transistor coupled to the power control transistor, the precharging transistor having a first terminal configured to receive the predetermined voltage from the power control transistor, a second terminal connected to the data bus, and a gate terminal configured to receive a precharging control signal, wherein the precharging circuit is configured to precharge the data bus to have the predetermined voltage before data is transferred from a first latch to a second latch among the plurality of latches, wherein at least one of the first latch or the second latch comprises a first control transistor having a first terminal connected to the data bus and a gate terminal configured to receive a control voltage, and wherein the at least one of the first latch or the second latch is conductively coupled to the data bus by applying the control voltage to the at least one of the first latch or the second latch, the control voltage being determined based on the predetermined voltage.

18. The semiconductor device of claim 17, wherein the first latch comprises the first control transistor coupled to the data bus and configured to receive a first control signal with a first control voltage to turn on the first control transistor, wherein the second latch comprises a second control transistor coupled to the data bus and configured to receive a second control signal with a second control voltage to turn on the second control transistor, and wherein each of the first control voltage and the second control voltage is determined based on the predetermined voltage and by tracking a variation of a threshold voltage of a reference transistor, and wherein a variation of a threshold voltage of each of the first control transistor and the second control transistor is substantially same as the variation of the threshold voltage of the reference transistor.

19. The semiconductor device of claim 18, further comprising a voltage generator including the reference transistor, wherein the reference transistor comprises a first terminal coupled to a current source, a second terminal coupled to a resistor, and a gate terminal coupled to the first terminal, wherein the predetermined voltage corresponds to a voltage at the second terminal that is based on a resistance of the resistor and a current from the current source to the resistor, wherein a reference voltage at the gate terminal is a sum of the voltage at the second terminal and the threshold voltage of the reference transistor, and wherein each of the first control voltage and the second control voltage is based on the reference voltage.

20. The semiconductor device of claim 19, wherein the voltage generator further comprises an operational amplifier coupled to the gate terminal of the reference transistor and configured to output a tracking voltage based on the reference voltage, wherein the semiconductor device further comprises:

a first logic gate having a first logic input coupled to an output of the operational amplifier and a first logic output coupled to the first control transistor, and a second logic gate having a second logic input coupled to the output of the operational amplifier and a second logic output coupled to the second control transistor, and wherein each of the first control voltage and the second control voltage is substantially identical to the tracking voltage.

21. A method comprising:

precharging, by a precharging circuit, a data bus to have a predetermined voltage on the data bus, wherein the precharging circuit comprises a power control transistor and a precharging transistor coupled to the power control transistor, wherein the power control transistor has a first terminal configured to receive a higher supply voltage, a second terminal configured to output a predetermined voltage, and a gate terminal configured to an enable signal, and the power control transistor is configured to generate the predetermined voltage based on the higher supply voltage when the enable signal turns on the power control transistor, wherein the predetermined voltage is smaller than the higher supply voltage and greater than a lower supply voltage, and wherein the precharging transistor has a first terminal configured to receive a voltage corresponding to the predetermined voltage, a second terminal connected to the data bus, and a gate terminal configured to receive a precharging control signal;

conductively connecting a first circuit to the data bus by applying a first control voltage on the first circuit to cause a voltage on the data bus to correspond to a voltage at a first node in the first circuit, the voltage on the data bus being associated with the predetermined voltage on the data bus, the first circuit having a first node for receiving the higher supply voltage and a second node for receiving the lower supply voltage, the first circuit comprising a first control transistor having a first terminal connected to the data bus and a gate terminal configured to receive the first control voltage; and conductively connecting a second circuit to the data bus by applying a second control voltage on the second circuit to cause a voltage at a second node in the second circuit to correspond to the voltage on the data bus, the second circuit comprising a second control transistor having a first terminal connected to the data bus and a gate terminal configured to receive the second control voltage, wherein each of the first control voltage and the second control voltage is determined based on the predetermined voltage.

* * * * *